(12) United States Patent
Kobayashi

(10) Patent No.: US 7,551,833 B2
(45) Date of Patent: Jun. 23, 2009

(54) BROADCAST RECORDING SYSTEM, RECORDING APPARATUS, BROADCASTING APPARATUS, AND RECORDING PROGRAM FOR SAVING STORAGE SPACE OF RECORDING MEDIUM USED FOR RECORDING CONTENTS

(75) Inventor: Yoshikazu Kobayashi, Higashihiroshima (JP)

(73) Assignee: Panasonic Corporation, Osaka (JP)

( * ) Notice: Subject to any disclaimer, the term of this patent is extended or adjusted under 35 U.S.C. 154(b) by 882 days.

(21) Appl. No.: 10/504,767

(22) PCT Filed: Oct. 15, 2003

(86) PCT No.: PCT/JP03/13160

§ 371 (c)(1),
(2), (4) Date: Aug. 17, 2004

(87) PCT Pub. No.: WO2004/040906

PCT Pub. Date: May 13, 2004

(65) Prior Publication Data

US 2005/0105528 A1   May 19, 2005

(30) Foreign Application Priority Data

Oct. 15, 2002   (JP)   ............... 2002-300115

(51) Int. Cl.
  *H04N 5/76* (2006.01)
(52) U.S. Cl. .......................................... 386/46; 725/88
(58) Field of Classification Search .................. 386/46, 386/95, E5.002, 125, 126, 124, 83; 725/39, 725/50, 51, 59, 61, 86, 88, 91, 92
See application file for complete search history.

(56) References Cited

U.S. PATENT DOCUMENTS

| | | | | |
|---|---|---|---|---|
| 6,081,830 A | * | 6/2000 | Schindler | 709/204 |
| 7,457,520 B2 | * | 11/2008 | Rossetti et al. | 386/83 |
| 2003/0046702 A1 | * | 3/2003 | Sasaki | 725/88 |
| 2003/0177495 A1 | * | 9/2003 | Needham et al. | 725/55 |

FOREIGN PATENT DOCUMENTS

| | | | |
|---|---|---|---|
| JP | 09-018856 | | 1/1997 |
| JP | 2000-261784 | | 9/2000 |
| JP | 2002-521978 | | 7/2002 |
| WO | WO 80/02093 | * | 10/1980 |
| WO | 00/07368 | | 2/2000 |
| WO | 02/32139 | | 4/2002 |
| WO | 02/47383 | | 6/2002 |

* cited by examiner

*Primary Examiner*—David E Harvey
(74) *Attorney, Agent, or Firm*—Wenderoth, Lind & Ponack, L.L.P.

(57) ABSTRACT

An adding unit of a broadcasting apparatus attaches entry information to a content to be broadcast. The entry information specifies a content that is identical to the content to be broadcast out of a plurality of contents available for distribution by a distributing apparatus. A sending unit of the broadcasting apparatus broadcasts the content with the entry information attached thereto. An entry information recording unit of a recording apparatus records the entry information that is attached to the received content to a hard disk, and a requesting unit requests the distributing apparatus to distribute the content specified by the recoded entry information. A content distributing unit of the distributing apparatus receives the distribution request, and distributes the requested content to the recording apparatus. The recording apparatus plays back the distributed content.

15 Claims, 19 Drawing Sheets

FIG.4A

VIEWING REQUEST MESSAGE | MESSAGE NO. (FF01) | CONTENT ID (00 00 00 01)

FIG.4B

ADDITIONAL INFORMATION ACQUISITION MESSAGE | MESSAGE NO. (FF02) | CONTENT ID (00 30 00 C0)

FIG.5

| BROADCAST DATE/TIME | CONTENT ID | RELEASE DATE/TIME | EXPIRY DATE/TIME |
|---|---|---|---|
| 2003/07/25 10:00 | 00 00 00 01 | 2003/08/01 10:00 | 2004/12/31 23:59 |
| 2003/07/25 10:00 | 00 03 00 C0 | — | — |

FIG.7A

| CONTENT ID | RELEASE DATE/TIME | EXPIRY DATE/TIME |

FIG.7B 00 00 00 01   200308011000   200412312359
‾‾‾‾‾‾‾‾‾     ‾‾‾‾‾‾‾‾‾‾     ‾‾‾‾‾‾‾‾‾‾
00 00 00 01    2003/08/01     2004/12/31
                 10:00           23:59

FIG.7C 00 30 00 C0   FF FF FF FF FF FF
‾‾‾‾‾‾‾‾‾     ‾‾‾‾‾‾‾‾‾‾‾‾‾‾‾   ‾‾‾‾‾‾‾‾‾‾‾‾
00 03 00 C0       DEFAULT        NOT ACQUIRED

FIG.16

VIEWING REQUEST PACKET

```
PLAY rtsp://examples.com/sample2.mpg RTSP/1.0
CSeq:830
Session:1234
Range:1-
```

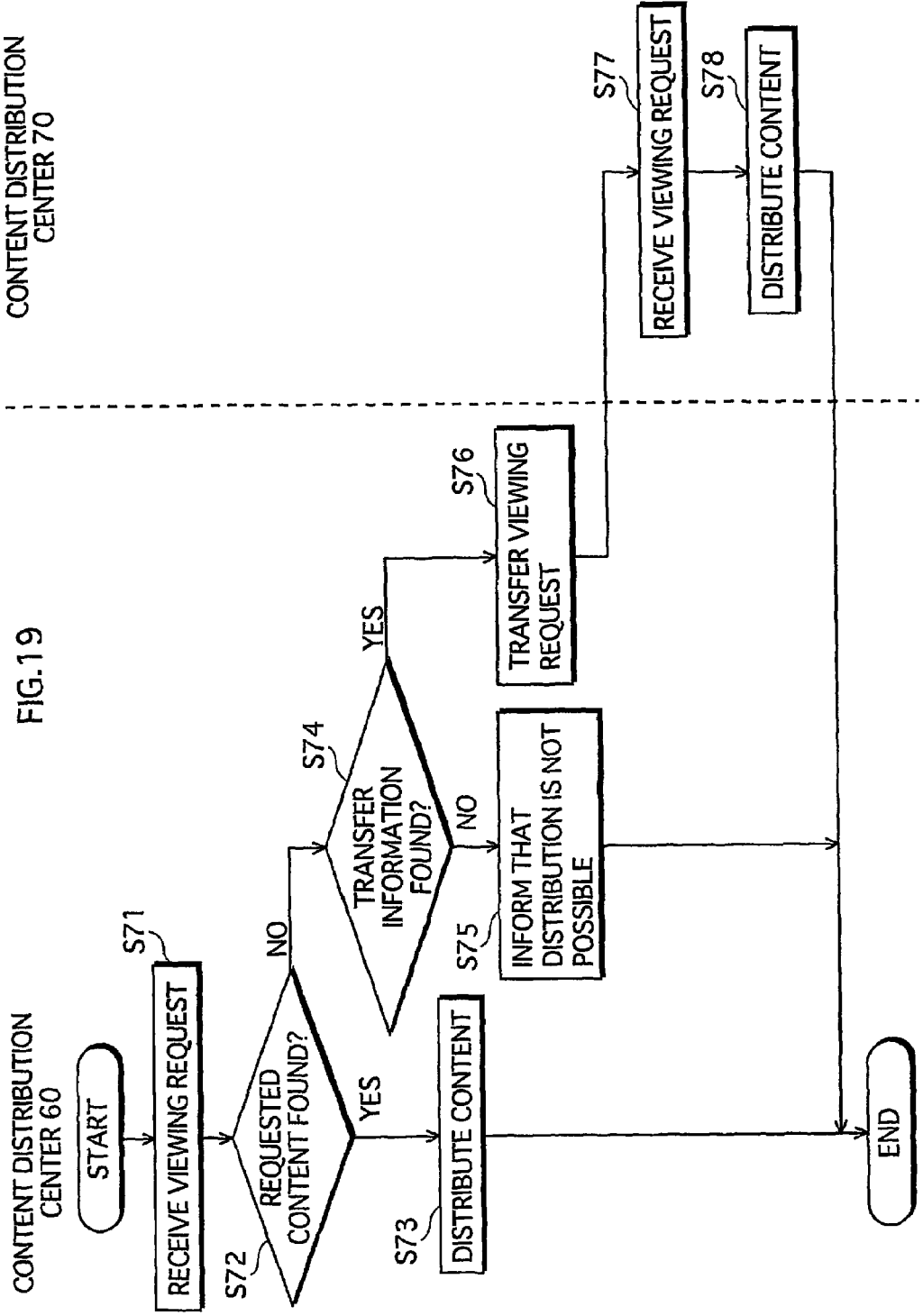

US 7,551,833 B2

BROADCAST RECORDING SYSTEM, RECORDING APPARATUS, BROADCASTING APPARATUS, AND RECORDING PROGRAM FOR SAVING STORAGE SPACE OF RECORDING MEDIUM USED FOR RECORDING CONTENTS

BACKGROUND OF THE INVENTION

1. Field of the Invention

The present invention relates to a broadcast recording system for recording broadcast contents for time-shift viewing. More particularly, the present invention relates to technology for reducing the storage space of a recording medium used to record the contents.

2. Description of the Related Art

In addition to real-time viewing, viewers of TV broadcasts are allowed to record contents with a recording apparatus for the purpose of time-shift viewing at their convenience.

JP Translation of International Application Publication No. 2002-521978 (page 13, FIG. 1) discloses technology for recording contents to a recording medium such as a hard disk in digital form and for playback of recorded contents.

FIG. 1 is a view showing the structure of a conventional recording apparatus 100. The recording apparatus 100 is composed of functional blocks of a receiving unit 101, a switch 102, an output unit 103, a hard disk 104, and a CPU 105.

The receiving unit 101 converts received contents to MPEG2 (Moving Picture Experts Group phase 2) streams, and outputs the resulting MPEG2 streams. For example, when video input is an analog signal according to the NTSC (National Television System Committee) standard, a tuner provided in the receiving unit 101 tunes for a target content, and an MPEG encoder, that is also provided in the receiving unit 101, converts the content to an MPEG2 stream and outputs the resulting stream. In another example, when video input is a digital signal is an MPEG2 transport stream (hereinafter simply referred to as TS) multiplexed with an MPEG2 stream containing a content, a digital tuner provided in the receiving unit 101 extracts a target MPEG2 stream from the inputted TS, and outputs the extracted MPEG2 stream.

The switch 102 receives, in recording operations, a content to be recorded from the receiving unit 101 and outputs the content to the hard disk 104. In playback operations, the switch 102 reads a content to be played back from the hard disk 104 and outputs the read content to the output unit 103.

The output unit 103 acquires an MPEG2 stream and outputs the acquired MPEG2 stream to a television set connected to the recording apparatus 100. In the case where the television set is in compliance with the NTSC standard, the output unit 103 outputs the content after decoding it to an NTSC signal.

The hard disk 104, in recording operations, records an MPEG2 stream inputted from the switch 102 to a storage area. In playback operations, the hard disk 104 reads an MPEG2 stream that corresponds to a content requested for playback, and outputs the read MPEG2 stream to the switch 102.

The CPU 105 controls operations of the receiving unit 101, the switch 102, the output unit 103, and the hard disk 104 in order to carryout recording or playback of a requested content according to a user operation or to a recording schedule programmed in advance by the user. When recoding of a content is requested by a user operation or a programmed recording schedule, the CPU 105 controls overall operations, so that the receiving unit 101 acquires the requested content, the switch 102 outputs the MPEG2 stream inputted from the receiving unit 101 to the hard disk unit 104, and the hard disk 104 records the inputted MPEG2 stream.

When playback of a content is requested by a user operation, the CPU 105 controls overall operations, so that the hard disk 104 reads an MPEG2 stream corresponding to the requested content, the switch 102 outputs the MPEG2 stream inputted from the hard disk 104 to the output unit 103, and the output unit 103 decodes the inputted MPEG2 stream to audio and video signals and then outputs the resulting signals to an external television set. There may be a case where the recording apparatus is requested to carry out playback of a content recorded in the hard disk 104 while recording another content. In this case, the CPU 105 controls the recording and the playback in parallel, so that the switch 102 outputs an MPEG2 stream inputted from the receiving unit 101 to the hard disk unit 104, and concurrently outputs an MPEG2 stream inputted from the hard disk 104 to the output unit 103.

The recording apparatus having the above-stated structure is capable of recording a content requested by a user, and playback of a recorded content any time at user's convenience.

Recently, recording apparatuses with a large-capacity recording medium such as a hard disk and a DVD-RAM are now in common use. Such a recording apparatus is capable of recording contents in digital form, which is bulky but of high image quality. Users of those recording apparatuses tend to record a number of contents for the purpose of time-shift viewing. In order to meet the users' demand for recording a large number of contents, it is desired to increase the storage capacity of recording apparatuses.

Unfortunately, however, increase in the storage capacity inevitably involves increase in the cost. Yet, it is undesirable to record contents at higher data compression ratio, which leads to another problem of degradation in image quality.

BRIEF DESCRIPTION OF THE INVENTION

The present invention is made in view of the above problems, and has a first object to provide a broadcast recording system capable of storing contents to a recording medium using a smaller storage space than that used in the prior art.

Further, it is a second object of the present invention to provide a recording apparatus and a broadcasting apparatus that are suitable for use in the broadcast recording system stated above.

Still further, it is a third object of the present invention to provide a recording program with which a computer runs to realize the functions of the recording apparatus stated above.

To achieve the objects stated above, the present invention provides a broadcast recording system having a broadcasting apparatus, a distributing apparatus, and a recording apparatus. The broadcasting apparatus includes: an attaching unit operable to attach to a broadcast content that is for broadcasting and that corresponds to a specific one of a plurality of contents each composed at least of video and audio data, entry information specifying a distribution content that is composed of video and audio data and identical to the specific content with respect to a substance of the video and audio data out of a plurality of distribution contents available for distribution by a distributing apparatus; and a broadcasting unit operable to broadcast the broadcast content with the attached entry information. The recording apparatus includes a receiving unit operable to receive the broadcast content with the attached entry information from the broadcasting apparatus; an entry information recording unit operable to record the entry information attached to the received broadcast content to a storage area; and a requesting unit operable to request the distributing apparatus to distribute the distribution content specified by the recorded entry information. The distributing apparatus distributes the specified distribution content to the recording apparatus in response to the distribution request from the requesting unit. The recording apparatus receives, after the broadcasting of the broadcast content that is identical to the specific content with respect to the substance of the video and audio data, the distribution content that is identical to the specific content with respect to the substance of the video and audio data and plays back the received distribution content. With the structure stated above, when broadcasting a broadcast content that corresponds to a predetermined content to a recording apparatus, the broadcasting apparatus broadcasts entry information together with the broadcast content. The entry information is to be used by the recording apparatus to receive a distribution content corresponding to the predetermined content. The recording apparatus records the entry information that is attached to the broadcast content. At a later time, the recording apparatus receives, using the recorded entry information, distribution of the distribution content that corresponds to the predetermined content. Consequently, the user can view the distribution content that is identical to the broadcast content with respect to a substance of the video and audio data.

That is to say, the recording apparatus receives from the distributing apparatus, a distribution content that corresponds to a broadcast content with a substantially equal image quality. With this arrangement, the user can view a content that corresponds to a broadcast content without any loss of image quality while saving the storage space of the recording apparatus that would otherwise be used to actually record the broadcast content.

To achieve the objects stated above, another aspect of the present invention provides a recording apparatus having: a receiving unit operable to receive, from a broadcasting apparatus for broadcasting broadcast contents each of which is for broadcasting together with entry information attached thereto and corresponds to a content composed at least of video and audio data, a broadcast content that is composed of video and audio data and is identical to a specific one of the contents with respect to a substance of the video and audio data together with attached entry information specifying a distribution content that is composed of video and audio data and is identical to the specific content with respect to a substance of the video and audio data out of a plurality of distribution contents available for distribution by a distributing apparatus; an entry information recording unit operable to record the entry information attached to the received broadcast content to a storage area; and a requesting unit operable to request the distributing apparatus to distribute the distribution content specified by the recorded entry information. The recording apparatus plays back the distribution content distributed by the distributing apparatus in response to the distribution request.

With the structure stated above, the recording apparatus records entry information attached to a broadcast content provided through broadcasting. At a later time, the recording apparatus uses the recorded entry information so as to receive from the distributing apparatus, a distribution content that is identical to the broadcast content with respect to a substance of the video and audio data. Consequently, the user is allowed to view the distribution content at a later time.

That is to say, the storage space of the recording apparatus is significantly saved in comparison with the case where the broadcast content is actually recorded. Further, even when the user makes a recordation request some time after the start of broadcasting of a broadcast content, the recording apparatus records the entry information, and receives a distribution content from the distributing apparatus using the recorded entry information. Consequently, the user is allowed to view the distribution content from the beginning of the content.

Here, the broadcast content and the distribution content that correspond to the specific content may be all identical as a copyrighted work, and at least one of the broadcast content and the specific content may differ from the specific content with respect to an image quality.

With the structure stated above, the recording apparatus can receive a distribution content of which substance as a copyrighted work is identical to a broadcast content although the image quality is different.

Here, the recording apparatus may further have: a judging unit operable to judge whether to record the received broadcast content; and a content recording unit operable to record the received broadcast content to the storage area when the judging unit judges to record the broadcast content.

With the structure stated above, the broadcast content is also recorded in addition to the entry information.

Consequently, when either of a broadcast content and a distribution content is preferable to the other in some regard, the recording apparatus allows the user to view whichever content is preferable.

Here, the judging unit may judge not to record the received broadcast content when the entry information is attached, and may judge to record the received broadcast content when the entry information is not attached.

With the structure stated above, when failing to acquire entry information attached to a broadcast content, the recording apparatus records the broadcast content to the storage area.

That is to say, when duly acquiring entry information attached to a broadcast content, the recording apparatus does not record the broadcast content, thereby saving the storage space. Yet, when failing to acquire entry information attached to a broadcast content, the recording apparatus records the broadcast content so as to ensure that the content is available for the user to view at a later time.

Here, the entry information may further include information showing image quality of the distribution content specified by the entry information. The judging unit may judge to record the received broadcast content when image quality of the received broadcast content is higher than the image quality shown by the entry information, and may judge not to record the received broadcast content when the image quality of the received broadcast content is lower.

With the structure stated above, the recording apparatus compares a broadcast content broadcast from the broadcasting apparatus with a distribution content to be distributed by the distributing apparatus. When the broadcast content is of better image quality, the recording apparatus records the broadcast content. Consequently, the user is allowed time-shift viewing of the broadcast content that is of good image quality. On the other hand, when the distribution content is of better image quality, the recording apparatus records entry information. Consequently, the storage space that would otherwise be used to record the broadcast content is saved, and yet the user is allowed to view the distribution content that is of good image quality at a later time.

Here, the judging unit may judge to record the received broadcast content when a free storage space remaining in the storage area is greater than a storage space required for recording the broadcast content, and may judge not to record the received broadcast content when the free storage space is smaller.

With the structure stated above, when enough storage space is left to record a broadcast content, the recording apparatus records the broadcast content.

Consequently, when a broadcast content is preferable to a distribution content in some regard, for example in the image quality, the broadcast content is recorded as long as the available storage capacity permits. In addition, even if there is not enough storage space to store the broadcast content, the distribution content is still acquired for viewing although the distribution content is of lower image quality.

Here, the entry information recording unit may not record the entry information when the broadcast content is judged to be recorded.

With the structure stated above, redundant storage of both a broadcast content and entry information is avoided, so that the storage space to be used is minimized.

Here, the entry information recording unit may record to the storage area, the entry information attached the broadcast content being recorded by the content recording unit when a free storage space of the storage area falls short to record entirety of the broadcast content.

With the structure stated above, even if the storage space runs out in the middle of recordation of a broadcast content, the user is still allowed to view the content as the recording apparatus receives a distributing content using the recorded entry information.

Here, the recording apparatus may further have: a content recording unit operable to record the received broadcast content to the storage area; and a content deleting unit. The entry information may further include information showing a release date-time on which the distribution content starts to be available for distribution, and the content deleting unit may delete the broadcast content recorded by the content recording unit from the storage area on or after the release date-time.

With the structure stated above, the recording apparatus records a broadcast content in addition to entry information in the case where it is a while until a release date/time of a corresponding distribution content and thus the distribution content is not yet available for the on-demand distribution service at the time of the broadcasting. Consequently, the user is allowed to view the recorded broadcast content until the release date/time comes. In addition, since the recording apparatus deletes the recorded broadcast content on or after the release date/time, the storage space that would otherwise be kept occupied by the broadcast content is saved.

Consequently, the recording apparatus is capable of saving the storage space at an earliest possible time, while eliminating the undesirable possibility that the user is unable to see neither a broadcast content nor a distribution content.

Here, the recording apparatus may further have a content recording unit operable to record, to the storage area, the distribution content that is distributed by the distributing apparatus in response to the distribution request. The entry information may further include information showing an expiry date-time after which the distribution content is no longer available for distribution. The requesting unit may request distribution of the distribution content prior to the expiry date-time.

With the structure stated above, the recording apparatus receives and records a distribution content before the distributing apparatus terminates the distribution service for the content. Consequently, while saving the storage space as long as possible, the recording apparatus manages to eliminate the possibility that the user can not view a desired content because the recording apparatus only stores entry information of the content and a corresponding distribution content is no longer available due to the expiry of the distribution service.

Here, the recording apparatus may further have an entry information requesting unit operable to request the distributing apparatus to distribute the entry information when any information item is missing in the entry information attached to the received broadcast content. The entry information recording unit may record, to the storage area, the entry information that is distributed from the distributing apparatus in response to the request from the entry information requesting unit.

With the structure stated above, the recording apparatus newly acquires entry information when the entry information fails to correctly record.

Consequently, the recording apparatus is provided with a greater number of opportunities to acquire entry information, so that the chances of saving the storage space increases.

Here, the receiving unit may receive from the broadcasting apparatus, a broadcast content corresponding to a first content and with first entry information attached thereto. The first entry information specifies a distribution content that is composed of video and audio data and is identical to the first content with respect to a substance of the video and audio data. The receiving unit may further receive, after the entry information recording unit records the first entry information, a broadcast content that corresponds to a second content and that is broadcast with second entry information attached thereto from another broadcasting apparatus during the broadcasting of the broadcast content corresponding to the first content. The second entry information specifies a distribution content that is composed of video and audio data and identical to the second content with respect to a substance of the video and audio data. The entry information recording unit may record the first entry information to the storage area when the receiving unit receives the broadcast content to which the first entry information is attached, and further record the second entry information to the storage area when the receiving unit receives the broadcast content to which the second entry information is attached.

With the structure stated above, the recording apparatus records first entry information attached to a broadcast content, which eliminates the need to record the broadcast content at all times throughout the broadcasting hours. Consequently, the recording apparatus is capable of recording second entry information that is attached to another broadcast content on another channel although the broadcasting hours of the two broadcast contents overlap.

Since entry information is recorded only within a time period shorter than the broadcasting hours, a recording apparatus without a plurality of tuners is still capable of sequentially selecting a broadcast channel and records entry information attached to a broadcast content on each channel. At a later time, the recording apparatus receives distribution contents using each piece of stored entry information. Consequently, the user is allowed to view playback of a plurality of contents that are concurrently broadcast, so that the user's convenience increases.

Here, the broadcasting apparatus may broadcast a broadcast content multiplexed with another broadcast content. One of the broadcast contents corresponds to a first content and with first entry information attached thereto. The first entry information may specify a distribution content that is composed of video and audio data and identical to the first content with respect to a substance of the video and audio data. The other broadcast content corresponds to a second content and with second entry information attached thereto. The second entry information specifies a distribution content that is composed of video and audio data and identical to the second content with respect to a substance of the video and audio data. The information recording unit may record the first entry information and the second entry information to the storage area.

With the structure stated above, the recording apparatus receives a broadcast wave, into which a plurality of broadcast contents is multiplexed, and stores entry information of each of the multiplexed broadcast contents.

Consequently, even without an advanced capability of recording a plurality of broadcast contents in parallel, the recording apparatus is still capable of recording a plurality of pieces of entry information, so that corresponding distribution contents may be later received for viewing.

To achieve the objects stated above, yet another aspect of the present invention provides a broadcasting apparatus having: an attaching unit operable to attach to a broadcast content that is for broadcasting and that corresponds to a specific one of a plurality of contents each composed of at least video and audio data, entry information specifying a distribution content that is composed of video and audio data and is identical to the specific content with respect to a substance of the video and audio data out of a plurality of distribution contents available for distribution by a distributing apparatus; and a broadcasting unit operable to broadcast the broadcast content with the attached entry information.

With the structure stated above, the broadcasting apparatus provides, to a recording apparatus, a broadcast content corresponding to a predetermined content together with entry information. The entry information is to be used by the recording apparatus to receive a distribution content that corresponds to the predetermined content.

Consequently, the recording apparatus, which receives a content broadcast from the broadcasting apparatus, is allowed to store entry information attached to the broadcast content. Using the entry information, the recording apparatus can later receive a distribution content corresponding to the broadcast content, so that the user can view the received distribution content. Further, since the distributing apparatus distributes a distribution content which is substantially identical to a broadcast content with respect to a substance of the video and audio data and image quality, the storage space of the recording apparatus is significantly saved in comparison with the case where the recording apparatus records all the broadcast contents.

Here, the attaching unit may further include: a distribution judging subunit operable to judge whether the distribution content corresponding the specific content is available for distribution by the distributing apparatus; and an entry information generating subunit operable, when the distribution judging subunit judges in affirmative, to generate the entry information specifying the distribution content corresponding the specific content, and attach the generated entry information to the broadcast content.

With the structure stated above, when broadcasting a broadcast content to which a corresponding content is available for distribution by the distributing apparatus, the broadcasting apparatus attaches entry information to the broadcast content.

To achieve the objects stated above, yet another aspect of the present invention provides a recording program for having a computer perform: a receiving step of receiving, from a broadcasting apparatus for broadcasting broadcast contents each of which is for broadcasting together with entry information attached thereto and corresponds to a content composed at least of video and audio data, a broadcast content that is composed of video and audio data and is identical to a specific one of the contents with respect to a substance of the video and audio data together with attached entry information specifying a distribution content that is composed of video and audio data and is identical to the specific content with respect to a substance of the video and audio data out of a plurality of distribution contents available for distribution by a distributing apparatus; an entry information recording step of recording the entry information attached to the received broadcast content to a storage area; a requesting step of requesting the distributing apparatus to distribute the distribution content specified by the recorded entry information; and a playback step of playing back the distribution content distributed by the distributing apparatus in response to the distribution request.

With the structure stated above, the recording apparatus is allowed to record entry information attached to a broadcast content that is broadcast from the broadcasting apparatus, and uses, at a later time, to receive distribution of a corresponding distribution content. Consequently, the user can view the distribution content that is identical to the broadcast content with respect to a substance of the video and audio data.

BRIEF DESCRIPTION OF THE DRAWINGS

FIGS. 4A and 4b are views showing the data structures of messages generated by a request generating subunit 121;

FIG. 5 is a view showing the data structure of a distribution information table stored in a distribution content accumulating unit 23;

FIGS. 7A, 7B, and 7C are views showing the data structure of entry information acquired by an entry information recording unit 106 along with specific examples of the entry information;

FIG. 16 is a view showing the details of a packet generated by a request generating subunit 210;

FIG. 19 is a view showing the flow of the operations performed by the broadcast recording system 2 to provide a content through the on-demand distribution service.

DETAILED DESCRIPTION OF THE INVENTION

The following describes a broadcast recording system as an embodiment according to the present invention, with reference to the accompanying drawings.

Embodiment 1

Overview

A broadcast recording system 1 according to an embodiment 1 of the present invention receives contents that are broadcast or distributed on-demand via a cable television (hereinafter, referred to as "CATV") cable. Users who subscribe to the CATV are allowed to record received contents with a recording apparatus.

Each broadcast content is attached an identifier of a corresponding content, which is used to request on-demand distribution of that content. The recording apparatus may record an identifier without an actual content. To play back the content, the recording apparatus requests distribution of the content using the identifier so as to receive the content. With this arrangement, the recording apparatus saves a significant amount of the storage space that would otherwise be used to record actual contents.

<Structure>

1.1 System Configuration

Figure 1:
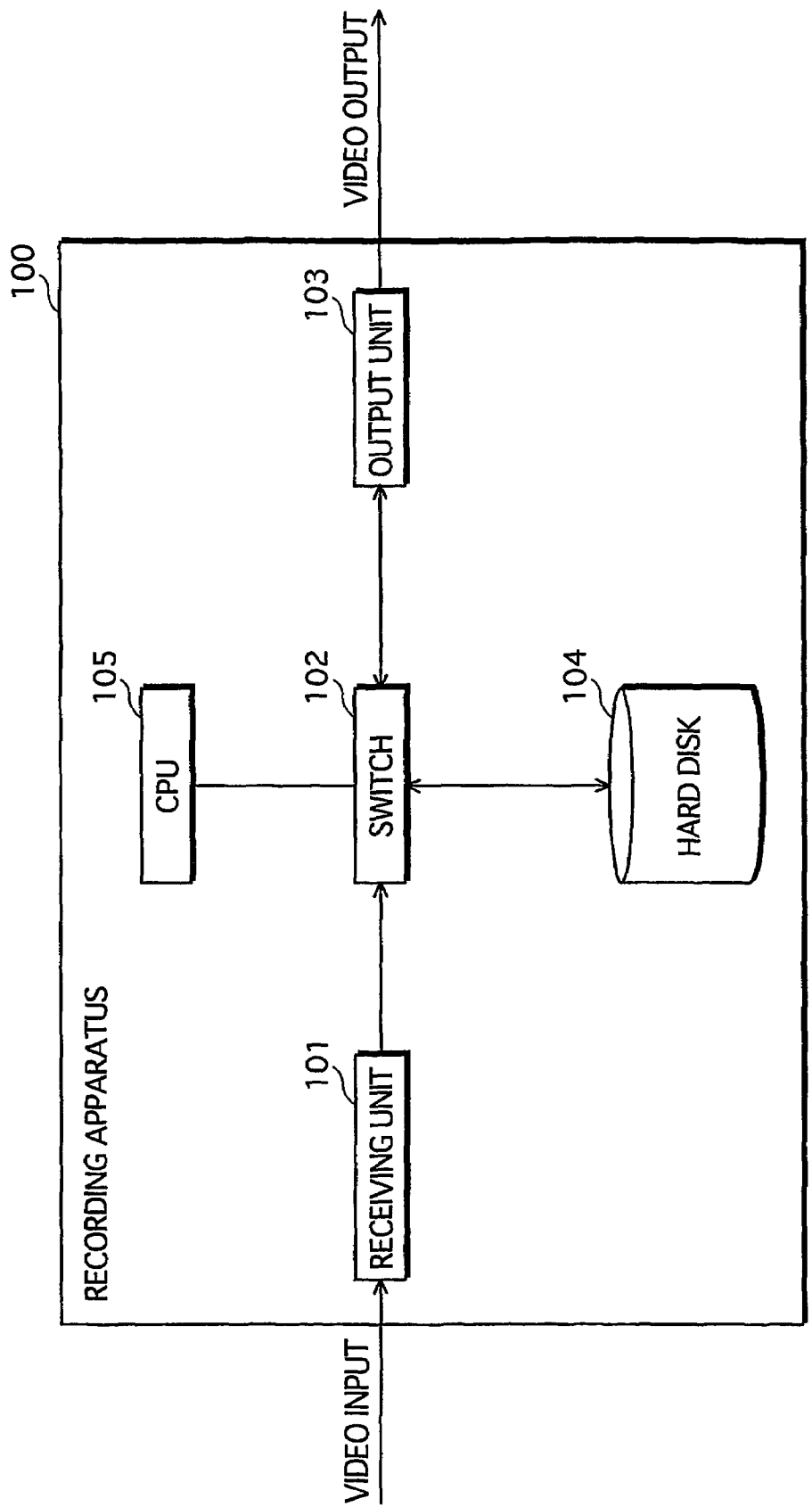
FIG. 1 is a view showing the structure of a conventional recording apparatus.
Figure 2:
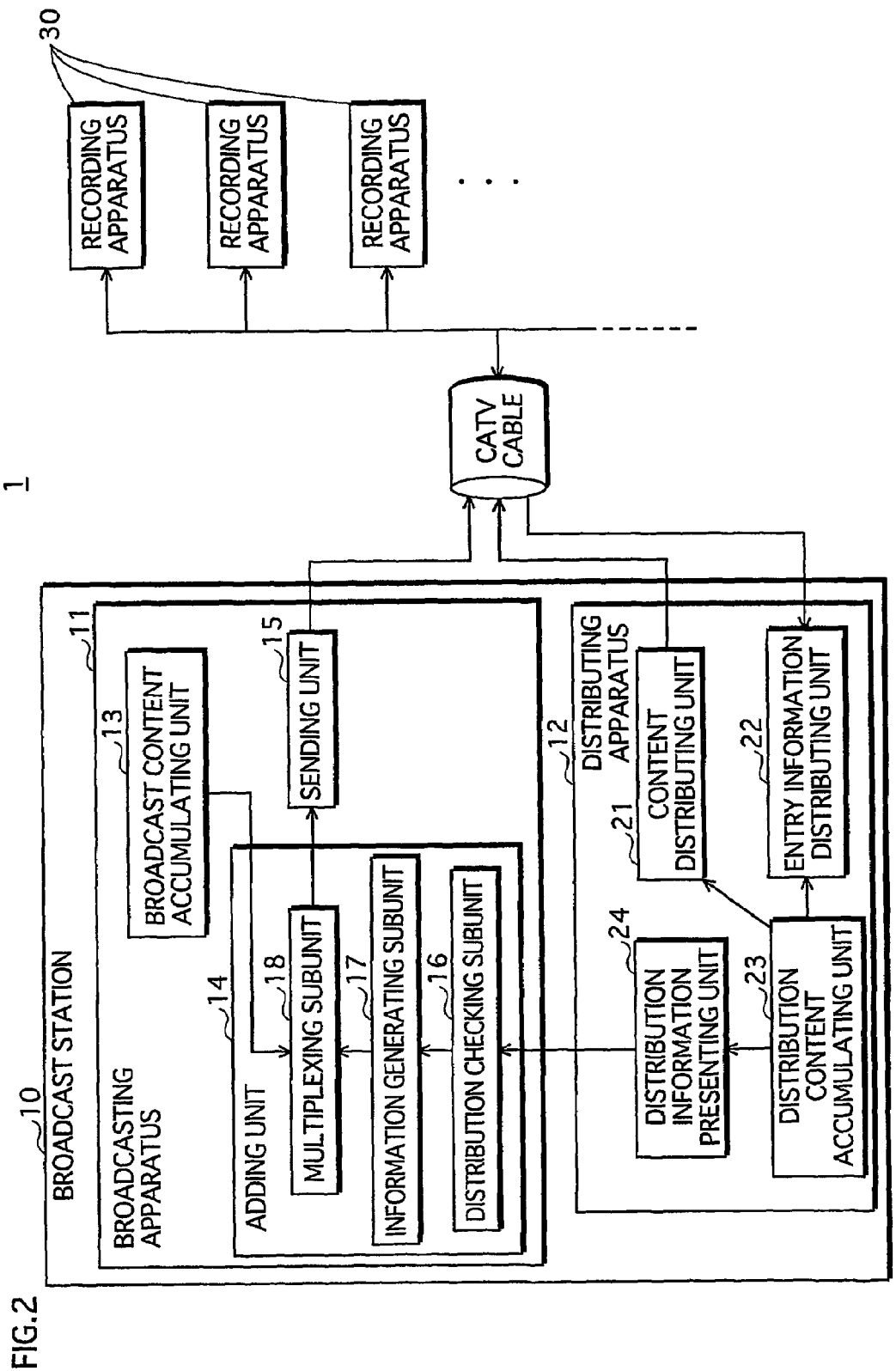
FIG. 2 is a view showing the configuration of a broadcast recording system 1 according to an embodiment 1 of the present invention.

FIG. 2 is a view showing the configuration of the broadcast recording system 1 according to the embodiment 1 of the present invention.

The broadcast recording system 1 is composed of a broadcast station 10 and recording apparatuses 30. Each recording apparatus is connected to the broadcast station 10 via the CATV cable.

The broadcast station 10 provides contents through two types of services. One is a broadcast service to provide contents at scheduled times according to a predetermined broadcast timetable. The other is an on-demand service to provide, in response to a distribution request from a recording apparatus 30, the requested content to the recording apparatus 30 that issued the distribution request. The broadcast station 10 provides each content through the on-demand service only after broadcasting a corresponding content through the broadcast service.

For the sake of convenience, this specification hereinafter refers copyrighted works that are identical with respect to the substance as one and the same content. That is to say, when a content to be broadcast and a content to be distributed are identical with respect to the substance as a copyrighted work, the two contents are regarded as one and the same content irrespective of difference that may present in commercial messages inserted, the resolutions, and the bit rates.

Each recording apparatus 30 specifically is an HDD recorder with a built-in CATV tuner and located at home of a user being a CATV subscriber. Each recording apparatus 30 receives contents from the broadcast station 10 via the CATV cable through the broadcast service as well as the on-demand service, and records and/or plays back the received contents.

1.2 Broadcast Station 10

Hereinafter, description is given in detail to the broadcast station 10.

The broadcast station 10 is composed of a broadcasting apparatus 11 for providing contents through the broadcast service, and a distributing apparatus 12 for providing contents through the on-demand service.

The broadcasting apparatus 11 includes function blocks of a broadcast content accumulating unit 13, an adding unit 14, and a sending unit 15, and broadcasts video, audio, and control data of a target content according to the broadcast timetable, by multiplexing the data into a TS in compliance with the MPEG2 standard. In the case where the target content is permitted to be later distributed from the distributing apparatus 12, the broadcasting apparatus 11 additionally multiplexes entry information used by the distributing apparatus 12 to specify the content, and broadcasts the resulting TS.

The broadcast content accumulating unit 13 is a large-capacity storage device that accumulates contents to be broadcast through the broadcast service in MPEG2 streams. Here, each content is accumulated with commercial messages inserted thereto, and thus in the ready state for broadcasting without any further processing.

The adding unit 14 includes functional blocks of a distribution checking subunit 16, an information generating subunit 17, and a multiplexing subunit 18. Prior to broadcasting a content that is permitted to be distributed through the on-demand service, the adding unit 14 additionally multiplexes entry information of the target content into the TS.

The distribution checking subunit 16 informs a distribution information presenting unit 24 of the distributing apparatus 12 about a broadcasting date/time of a content to be broadcast, and receives information about whether a content identical to the content to be broadcast is permitted to be distributed through the on-demand service. On receiving information that on-demand distribution of the content is permitted, the distribution checking subunit 16 also receives a content ID, a release date/time, and an expiry date/time of the content from the distribution information presenting unit 24, and outputs the received information to the information generating subunit 17.

The information generating subunit 17 generates entry information with a later described data structure using the information received from the distribution checking subunit 16.

The multiplexing subunit 18 generates a TS 300 to be broadcast from the sending unit 15. The TS 300 is generated by multiplexing the MPEG2 stream read from the broadcast content accumulating unit 13 with the entry information generated by the information generating subunit 17.

The sending unit 15 sends the TS outputted from the multiplexing subunit 18 via the CATV cable according to the predetermined broadcast timetable.

Figure 3:
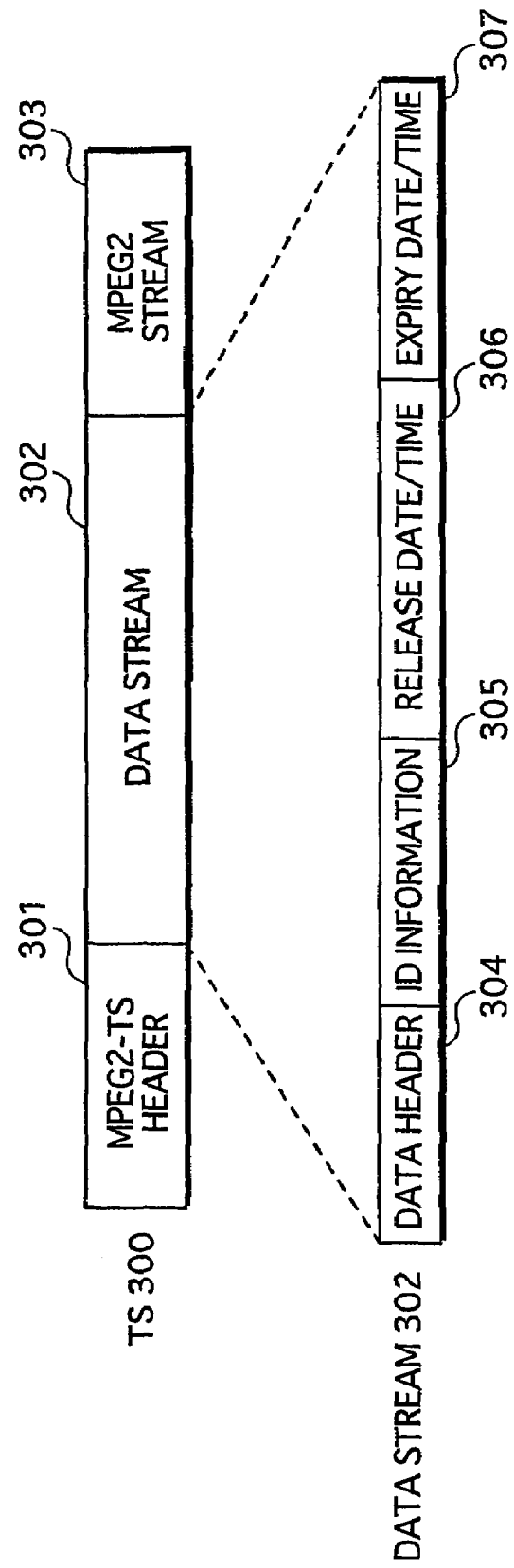
FIG. 3 is a view showing the data structures of entry information according to the embodiment 1 and a TS 300 into which the entry information is multiplexed.

FIG. 3 is a view showing the data structures of entry information according to the embodiment 1 and the TS 300 into which the entry information is multiplexed.

The TS 300 is generated by multiplexing an MPEG2-TS header 301 which is the control information for the TS, a data stream 302 containing the entry information, and an MPEG2 stream 303 containing video and audio data of the content.

The data stream 302 includes a data header 304 and the entry information that is composed of a content ID 305, release date/time information 306, and expiry date/time information 307.

The content ID 305 is an identifier for the distributing apparatus 12 to uniquely identify a content that is identical to the one multiplexed in the TS. The release date/time information 306 shows a date/time at which the distributing apparatus 12 starts the on-demand service for the content identified by the content ID 305. The expiry date/time information 307 shows a date/time at which the distributing apparatus 12 ends the on-demand service for the content identified by the content ID 305.

The data stream 302 is transmitted in such a manner that the entry information is repeatedly transmitted during the broadcasting of the content. Consequently, the entry information may be extracted from the TS at any intended time during the broadcasting of the content.

The MPEG-2 TS header and the MPEG2 stream are well-known in the art defined in the MPEG2 standard, and thus description thereof is omitted here.

The distributing apparatus 12 is composed of a content distributing unit 21, an entry information distributing unit 22, a distribution content accumulating unit 23, and a distribution information presenting unit 24.

The content distributing unit 21 receives a viewing request message shown in FIG. 4A from a recording apparatus 30, reads a content specified by a content ID included in the viewing request message, and distributes the read content to the recording apparatus 30 being the request source.

The entry information distributing unit 22 receives additional information acquisition message shown in FIG. 4B, searches a distribution information table shown in FIG. 5 for a content ID included in the additional information acquisition message to acquire a corresponding piece of release date/time information and expiry date/time information, and transmits the acquired information to the recording apparatus 30 that issued the request.

The distribution content accumulating unit 23 is a large-capacity recording device storing contents in MPEG2 streams available for on-demand distribution. The distribution content accumulating unit 23 also stores the distribution information table in the storage area.

FIG. 5 is a view showing the data structure of the distribution information table stored in the distribution content accumulating unit 23. The distribution information table contains as many pieces of distribution information as the contents available for on-demand distribution.

Each piece of distribution information is in one-to-one correspondence with a different one of the distribution contents, and is composed of a broadcast date/time, a content ID, a release date/time, and an expiry date/time of a corresponding content. The broadcast date/time shows the date/time at which a broadcast content identical to the corresponding content is broadcast by the broadcasting apparatus 11. The content ID is an identifier that uniquely identifies the corresponding content. The release date/time and the expiry date/time show the starting date/time and the ending date/time of a period during which the corresponding content is available for on-demand distribution. Note that in the case where the corresponding content has already been made available for on-demand distribution, the release date/time is not specified. Further, the expiry date/time is not specified in the case where there is no expiry for the period during which the corresponding content may be distributed.

The distribution information presenting unit 24 receives, from the distribution checking subunit 16, the broadcast date/time of a content to be broadcast, and searches the distribution information table for matching distribution information that contains the received broadcast date/time. When finding matching distribution information, the distribution information presenting unit 24 informs the distribution checking subunit 16 that the content to be broadcast is available for on-demand distribution, and outputs the content ID, the release date/time and the expiry date/time shown by the matching distribution information to the distribution checking subunit 16.

1.3 Recording Apparatus 30

Next, description is given to the structure of a recording apparatus 30. Note that all of the recording apparatuses 30 are similar to each other in structure.

Figure 6:
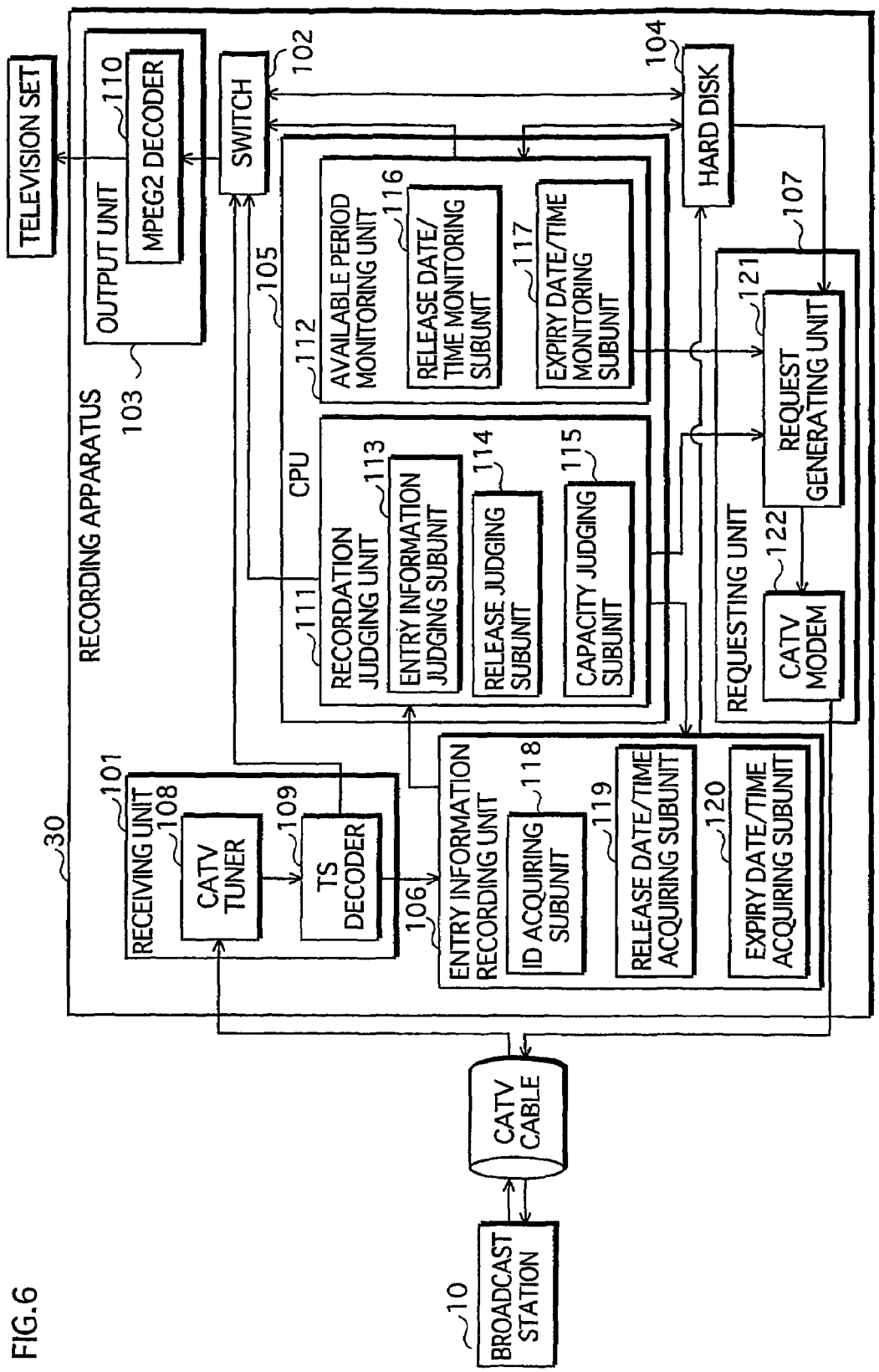
FIG. 6 is a view showing the structure of a recording apparatus 30 according to the embodiment 1 of the present invention.

FIG. 6 is a view showing the structure of the recording apparatus 30 according to the embodiment 1 of the present invention.

The recording apparatus 30 is composed of a receiving unit 101, a switch 102, an output unit 103, a hard disk 104, a CPU 105, an entry information recording unit 106, and a requesting unit 107. Note that those components denoted by the same reference numerals as in the conventional recording apparatus 100 are similar to the corresponding components, and thus the description thereof is omitted.

The receiving unit 101 is a functional block for receiving a TS that is broadcast or distributed from the broadcast station 10. Specifically, the receiving unit 101 is composed of a CATV tuner 108 and a TS decoder 109.

The CATV tuner 108 selectively extracts, from signals received via the CATV cable, a TS on a channel specified or programmed in advance by a user operation.

The TS decoder 109 demultiplexes the TS acquired by the CATV tuner 108 so as to separate an MPEG2 stream and a data stream, and then outputs the MPEG2 stream to the switch 102 and the data stream to the entry information recording unit 106.

Specifically, the output unit 103 is an MPEG2 decoder 110. On receiving the content that is encoded to the MPEG2 stream from the switch 102, the output unit 103 decodes the MPEG2 stream to an NTSC signal, and outputs the resulting NTSC signal to the television set.

The entry information recording unit 106 includes an ID acquiring subunit 118, a release date/time acquiring subunit 119, and an expiry date/time acquiring subunit 120. On receiving the data stream separated from the TS by the TS decoder 109, the ID acquiring subunit 118, the release date/time acquiring subunit 119, and the expiry date/time acquiring subunit 120 extract the content ID, the release date/time, and the expiry date/time from the data stream, respectively. As a result, the entry information recording unit 106 acquires the entry information shown in FIG. 7A. FIGS. 7A, 7B, and 7C show the data structure of the entry information acquired by the entry information recording unit 106 along with specific examples of the entry information.

Further, the entry information recording unit 106 informs a recordation judging unit 111 as to whether each of the content ID, release date/time, and expiry date/time has been acquired, and records the entry information to the hard disk 104 according to instructions from the recordation judging unit 111.

The requesting unit 107 is composed of a request generating subunit 121 and a CATV modem 122, and issues, to the distributing apparatus 12, a request for on-demand distribution of a content and a request for transmission of entry information.

The request generating subunit 121 generates a viewing request message shown in FIG. 4A, and then the CATV modem 122 transmits the generated message to the distributing apparatus 12 via the CATV cable. The request generating subunit 121 performs the above operation at the time of playback of a content of which entry information is recorded in the hard disk 104 without the content itself, or in response to an instruction from an expiry date/time monitoring subunit 117 that monitors expiry dates/times.

Further, in response to an instruction from the recordation judging unit 111 to acquire entry information, the request generating subunit 121 acquires a content ID corresponding the entry information to be acquired, generates an additional information acquisition message shown in FIG. 4B. Subsequently, the CATV modem 122 converts the generated message to an output signal, and transmits the resulting signal to the distributing apparatus 12 via the CATV cable. Note that the request generating subunit 121 may acquire the content ID directly from the entry information recording unit 106, or by reading a content ID written to the hard disk 104 by the entry information recording unit 106.

The CPU 105 controls each functional block so as to control recordation or playback of a content.

In response to a user operation requesting playback of a content, the CPU 105 attempts to acquire the requested content from the hard disk 104. In the case where the hard disk 104 stores an MPEG2 stream of the requested content, the CPU 105 instructs to read the MPEG2 stream, and controls the switch 102 and the MPEG2 decoder 110 so as to play back the content.

On the other hand, in the case where the hard disk 104 only stores entry information of the requested content without the MPEG2 stream, the CPU 105 controls the hard disk 104 to output the entry information to the requesting unit 107, and instructs the requesting unit 107 to transmit a viewing request message. The CPU 105 further controls the CATV tuner 108 and the TS decoder 109 to acquire the MPEG2 stream of the requested content from the TS that is transmitted in response to the viewing request message, and controls the switch 102 and the MPEG2 decoder 110 to play back the content.

The CPU 105 achieves functions of the recordation judging unit 111 and the available-period monitoring unit 112 by reading a computer program stored in a ROM or a hard disk and running the read computer program, thereby controlling recordation of a content.

The recordation judging unit 111 is a functional block that includes an entry information judging subunit 113, a release judging subunit 114, and a capacity judging subunit 115. When recordation of a content is requested by a user operation or by a programmed recording schedule, the recordation judging unit 111 judges whether to record the requested content and entry information to the hard disk 104. When judging, with the entry information judging subunit 113, the release judging subunit 114, and the capacity judging subunit 115, to record the requested content, the recordation judging unit 111 controls the switch 102 to record the content to the hard disk 104. On the other hand, when judging not to record the requested content, the recordation judging unit 111 instructs the entry information recording unit 106 to record the entry information to the hard disk 104.

The entry information judging subunit 113 receives information from the entry information recording unit 106 as to whether each of the content ID, release date/time information, and expiry date/time information has been acquired. When received information shows that the content ID is not acquired, the entry information judging subunit 113 judges to record the content. When informed that the content ID is acquired but there lease date/time information and/or the expiry date/time information is not acquired, the entry information judging subunit 113 instructs the requesting unit 107 to request for acquisition of the entry information.

When the entry information judging subunit 113 judges not to record the content, the capacity judging subunit 115 compares the storage space that is required to record the content with the available capacity, i.e. the free storage space, of the hard disk 104. When the free storage space is greater, the capacity judging subunit 115 judges to record the content. On the other hand, when the free storage space falls short, the capacity judging subunit 115 judges not to record the content.

Note that the storage space required for recording a content may be calculated precisely by using the user programmed recording hours and the bit rate of the content or by using a rough estimate. For example, when the content is of high image quality, such as so-called HDTV (High Definition Television) broadcasting, it may be roughly estimated that one-hour content requires approximately 5 gigabytes. When the recordation of the content is instructed by a user operation in real time and thus the recording hours are not yet known, the judgment may be made based on the storage space required for recording the content for a predetermined recording hours (for example, two hours).

When the capacity judging subunit 115 judges to record the entry information, the release judging subunit 114 compares the release date/time shown in the entry information with the current date/time. When the release date/time has not yet reached, the release judging subunit 114 judges to record the content to the hard disk 104 in addition to the entry information.

The available-period monitoring unit 112 is composed of a release date/time monitoring subunit 116 and the expiry date/time monitoring subunit 117. When entry information is once stored to the hard disk 104, the available-period monitoring unit 112 manages storage of the content and the entry information based on the release and expiry dates/times shown in the entry information so as to ensure the content is always available for viewing.

The release date/time monitoring subunit 116 operates when the release judging subunit 114 judges that the release date/time has not yet reached and thus both the entry information and the content are recorded in the hard disk 104. In this case, the release date/time monitoring subunit 116 monitors the date/time so as to control the hard disk 104 to delete the content at the time when the release date/time is reached.

The expiry date/time monitoring subunit 117 operates when entry information is stored alone in the hard disk 104 without a content. In this case, the expiry date/time monitoring subunit 117 monitors the date/time so as to control the requesting unit 107 to issue a distribution request for the content identified by the entry information when it is a predetermined time period (for example, a time period taken for transmission of the content) until the expiry date/time. The expiry date/time monitoring subunit 117 also controls the switch 102 to record the content that is distributed in response to the distribution request to the hard disk 104.

With the structure stated above, on receiving broadcasting of a content and attached entry information, the recording apparatus stores entry information without the content, and later receives on-demand distribution of the content using the recorded entry information. Consequently, the user of the recording apparatus is allowed to view the same content as the broadcast content anytime after the broadcasting.

That is to say, the recording apparatus is advantageous in saving a significant amount of the hard disk storage space in comparison with the case where every one of broadcast contents is stored. As a result, a greater number of contents may be stored in the hard disk. In other words, the recording apparatus is capable of storing an equal number of contents in a smaller capacity hard disk than in a conventional recording apparatus, which achieves an effect of reducing the cost of the recording apparatus.

Further, the recording apparatus, according to the embodiment 1, stores a content in addition to entry information during the time between the broadcast date/time and the release date/time, so that the user is allowed to view the content any time he desires. In addition, the recording apparatus deletes the content from the hard disk after the release date/time, which saves storage space that would otherwise be kept occupied by the content.

Still further, the recording apparatus receives on-demand distribution of the content prior to expiry of the on-demand service for the content, and records the received content to the hard disk. Consequently, such an event is avoided that the user can not view the content because the content is no longer available for on-demand distribution.

Note that the broadcast recording system 1 according to the embodiment 1 is described by way of the example in which one MPEG2 stream and a piece entry information is multiplexed to a TS. Yet, it is also applicable that a plurality of MPEG2 streams and corresponding pieces of entry information are all multiplexed to a TS stream. In this case, the recording apparatus stores the plurality of pieces of entry information.

One example is found in the case of recording a so-called multi-view type broadcast program, which is a TS into which a plurality of mutually-linked MPEG2 streams are multiplexed. Conventionally, when receiving such a multi-view type program, a recording apparatus is only capable of recording a main MPEG2 stream, so that the other MPEG2 streams are padded with null packets without being recorded. Naturally, the user can not view the contents of which MPEG2 streams are not recorded.

Unlike the conventional apparatus, when receiving a TS into which a plurality of MPEG2 streams and corresponding pieces of entry information are multiplexed, the recording apparatus of the present invention stores each piece of entry information corresponding to the MPEG2 streams other than the main MPEG2 stream. The pieces of entry information are stored into a storage area that is conventionally padded with null packets. With this arrangement, the recording apparatus of the present invention allows the user to view every content provided in the multi-view program.

<Operations>

Next, description is given to operations of the broadcast recording system 1 having the above structure.

1.4 Operations for Broadcasting Contents

Figure 8:
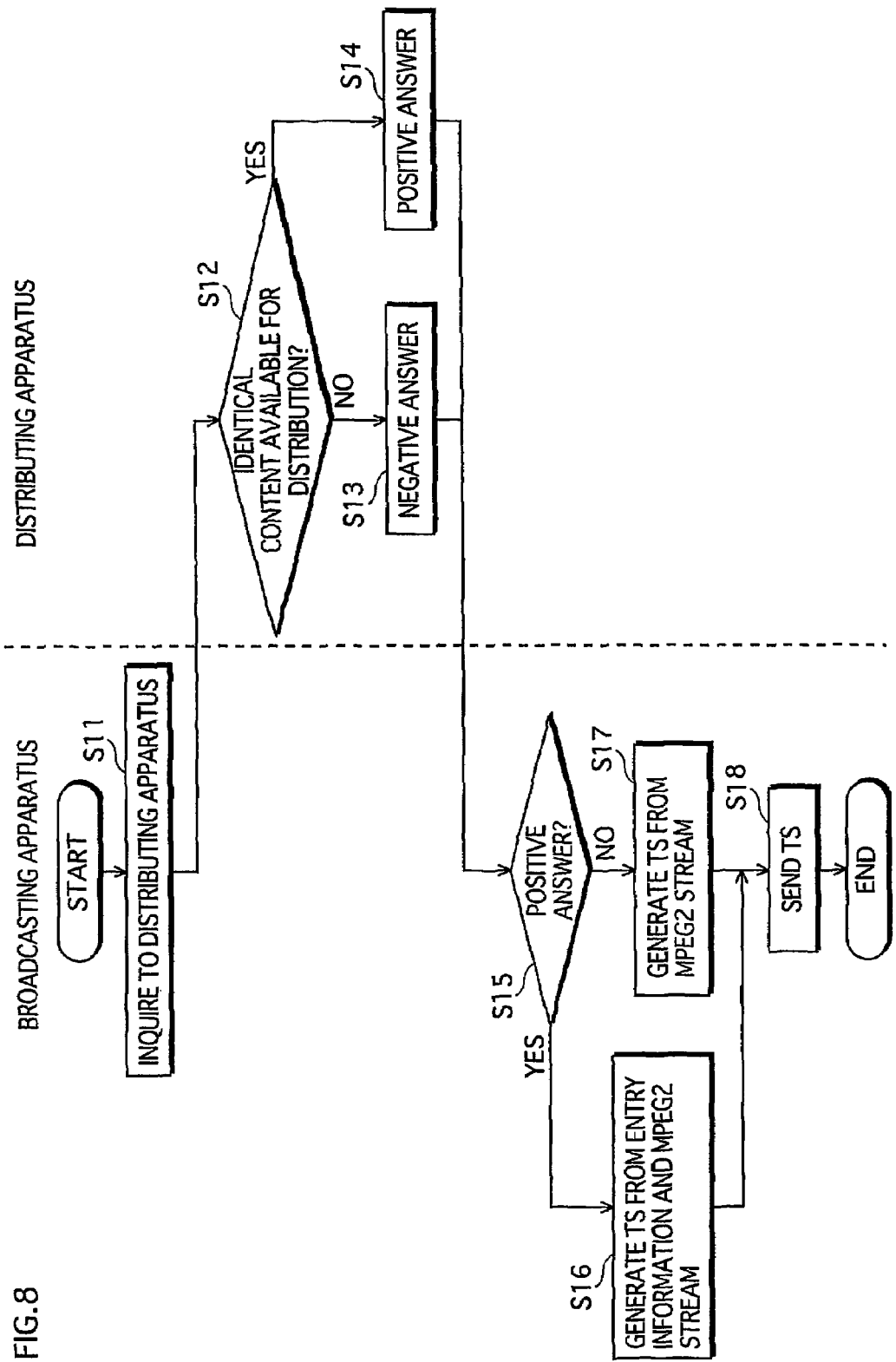
FIG. 8 is a view showing the flow of operations performed by the broadcast recording system 1 for broadcasting a content through the broadcast service.

FIG. 8 is a view showing the flow of operations performed by the broadcast recording system 1 according to the embodiment 1 for broadcasting a content through the broadcast service.

First, in order to check whether a content targeted to be broadcast will be available for on-demand distribution, the distribution checking subunit 16 of the broadcasting apparatus 11 informs the broadcast date/time of the target content to the distribution information presenting unit 24 of the distributing apparatus 12 (step S11).

On receiving the information regarding the broadcast date/time, the distribution information presenting unit 24 searches the distribution information table stored in the distribution content accumulating unit 23 for distribution information that contains a broadcast date/time matching the received broadcast date/time. When such distribution information is not found (S12: No), the distribution information presenting unit 24 informs the distribution checking subunit 16 that the target content is not be available for on-demand distribution (S13). On the other hand, when such distribution information is found in the distribution information table, the distribution information presenting unit 24 outputs the content ID, release date/time, and expiry date/time shown in the distribution information to the distribution checking subunit 16, thereby informing that the target content is available for on-demand distribution (S14).

When informed that the target content is available for on-demand distribution (S15: Yes), the information generating subunit 17 generates entry information from the content ID, release date/time, and expiry date/time received by the distribution checking subunit 16 from the distribution information presenting unit 24. Subsequently, the multiplexing subunit 18 generates a TS by multiplexing the generated entry information with an MPEG2 stream of the target content that is stored in the broadcast content accumulating unit 13 (S16). Here, in the case where the target content has been already available for on-demand distribution and thus the release date/time is not set, or where the expiry date/time is not specified, the information generating subunit 17 uses the default value "0XFFFFFFFFFFFF" indicating that the corresponding information item is not set, as in the release date/time shown in FIG. 7C. Further, in the case where the distribution checking subunit 16 fails to acquire a release date/time or expiry date/time having a valid value, the information generating subunit 17 generates entry information without setting any value for a corresponding information item.

On the other hand, when informed that the target content is not available for on-demand distribution (S15: No), the multiplexing subunit 18 generate a TS by multiplexing the MPEG2 stream of the target content stored in the broadcast content accumulating unit 13 (S17).

The sending unit 15 broadcasts the TS generated by the multiplexing subunit 18 via the CATV cable at a scheduled time according to the broadcast timetable (S18).

Through the above operations, when a content identical to a target content to be broadcast will be available for on-demand distribution, the broadcasting apparatus broadcasts entry information by attaching the entry information to the content. The entry information is used to identify a content corresponding to the target broadcast content out of a plurality of contents available for on-demand distribution.

1.5 Operations by Recording Apparatus 30 for Recording Content

Next, operations performed by the recording apparatus 30 for receiving a content and for recording the content to the hard disk for time-shift viewing.

Figure 9:
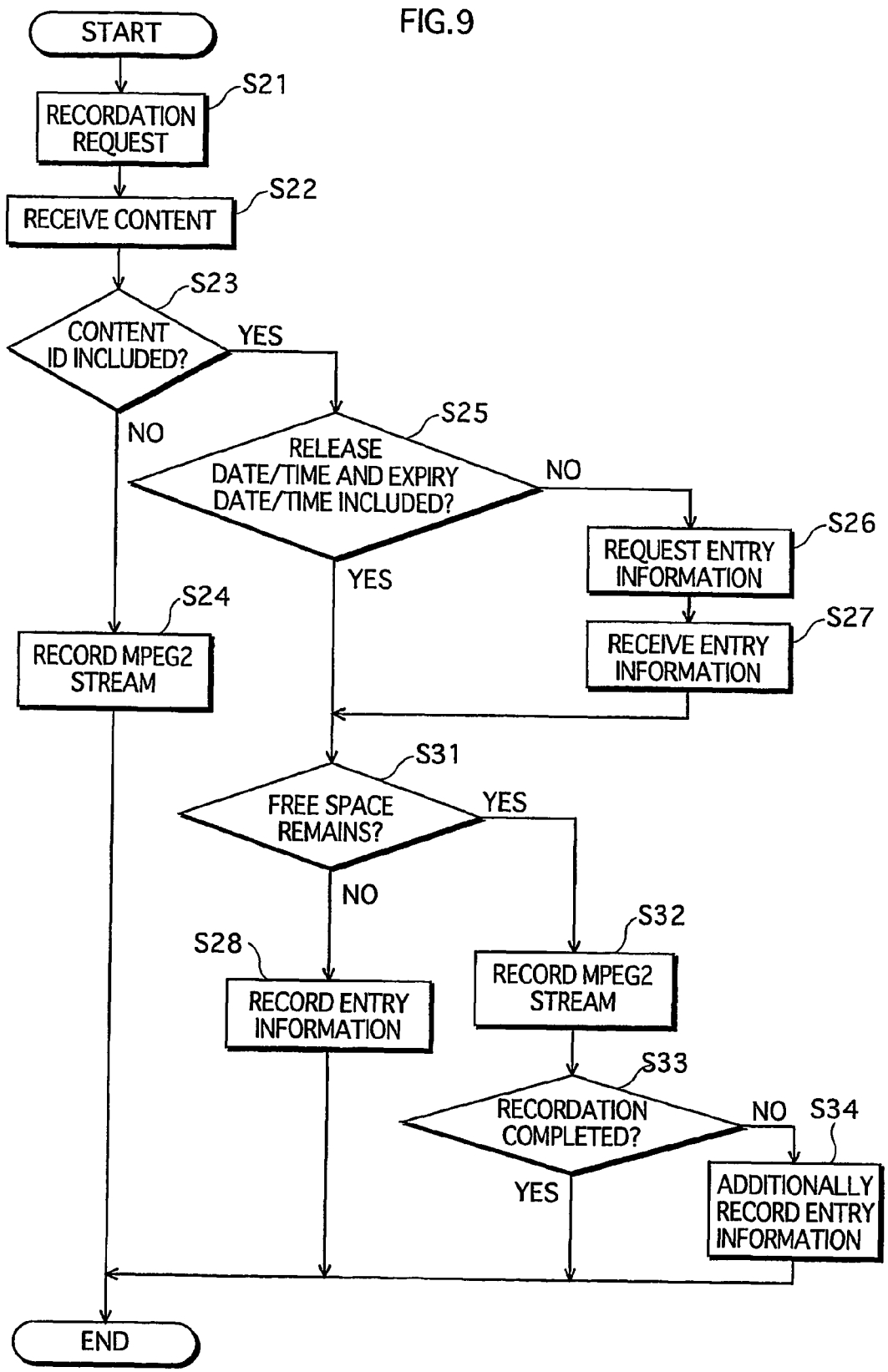
FIG. 9 is a view showing the flow of operations performed by the broadcast recording system 1 for recording a content that is broadcast through the broadcast service.

FIG. 9 is a view showing the flow of operations performed by the broadcast recording system 1 according to the embodiment 1 for recording a content that is broadcast through the broadcast service.

When recordation of a content is requested by a user operation or by a programmed recording schedule (S21), the CATV tuner 108 extracts a TS on a user requested channel from signals received via the CATV cable. The TS decoder 109 then demultiplexes the extracted TS into an MPEG2 stream and a data stream, and outputs the MPEG2 stream to the switch 102 and the data stream to the entry information recording unit 106 (S22).

The entry information recording unit 106 attempts to acquire a content ID, a release date/time, an expiry date/time from the data stream, and informs the recordation judging unit 111 of acquired information items (S23).

When informed that the entry information recording unit 106 fails to acquire a content ID (S23: No), the entry information judging subunit 113 of the recordation judging unit 111 judges that the content is not available for on-demand distribution, and thus controls the switch 102 to record the MPEG2 stream to the hard disk (S24). This operation completes the recordation of the content.

When informed that the content ID is acquired (S23: Yes), the entry information judging subunit 113 is further informed by the entry information recording unit 106 as to whether the release date/time and the expiry date/time are acquired from the data stream (S25).

In the case where the entry information recording unit 106 fails to acquire the expiry date/time as in the example shown in FIG. 7C, the recordation judging unit 111 is informed that either, or possibly both, of the release date/time and the expiry date/time is not acquired (S25: No). In this case, the entry information judging subunit 113 instructs the requesting unit 107 to transmit an additional information acquisition message which serves as an acquisition request for the entry information (S26).

In response to the additional information acquisition message from the requesting unit 107, the distributing apparatus 12 transmits a TS that includes the release date/time and expiry date/time of the content identified by the transmitted content ID. Subsequently, the CATV tuner 108 receives the TS, the TS decoder 109 demultiplexes the TS so as to separate a data stream that includes the release date/time and expiry date/time.

The release date/time acquiring subunit 119 and the expiry date/time acquiring subunit 120 extracts the release date/time and the expiry date/time from the data stream, respectively. Subsequently, the entry information recording unit 106 generates entry information, and the operations thereafter are continued (S27).

When informed that the release date/time and the expiry date/time are acquired (S25: Yes), the capacity judging subunit 115 of the recordation judging unit 111 compares the storage space required to store the requested content and the free storage space remaining in the hard disk 104. When the free storage space falls short (S31, No), the capacity judging subunit 115 instructs the entry information recording unit 106 to record the entry information (S28).

On the other hand, the free storage space is greater (Yes), the capacity judging subunit 115 controls the switch 102 to store the MPEG2 stream to the hard disk 104 (S32). There may be a case where the broadcasting hours of the content being recorded is longer than estimated, and thus the hard disk 104 runs out of the free storage space in the middle of the recordation process (S33: No). In that case, the recordation judging unit 111 instructs the entry information recording unit 106 to store the recordation information (S34).

Through the above operations, the recording apparatus records entry information instead of the MPEG2 stream, which serves to reduce required storage space of the hard disk 104.

Further, even when the hard disk 104 does not have enough free space to store the MPEG2 stream, the recording apparatus records the entry information, which is significantly smaller in size than the MPEG2 stream, to the hard disk 104. At a later time, the recording apparatus can receive on-demand distribution of the content for the user to view.

Further, the recording apparatus records the MPEG2 stream to the hard disk 104 when enough free space is left, which helps to reduce traffic between the distributing apparatus and the recording apparatus resulting from a viewing request that would be made otherwise.

Further, in the case where any information item (such as a release date/time and an expiry date/time) is missing in the entry information acquired with the broadcast content, the recording apparatus issues to the distributing apparatus, a distribution request for the entry information, which ensures to receive the entry information. Since the distributing apparatus uses the entry information for on-demand distribution, the recording apparatus can reliably receive entry information by issuing an additional information acquisition message. With the entry information being reliably received, the recording apparatus is allowed to collectively manage all the contents that are available for on-demand distribution by the distributing apparatus based on the content IDs, the release dates/times and the expiry dates/times.

Next, description is given to another example of operations performed by the content recording apparatus 30 to record a content.

Figure 10:
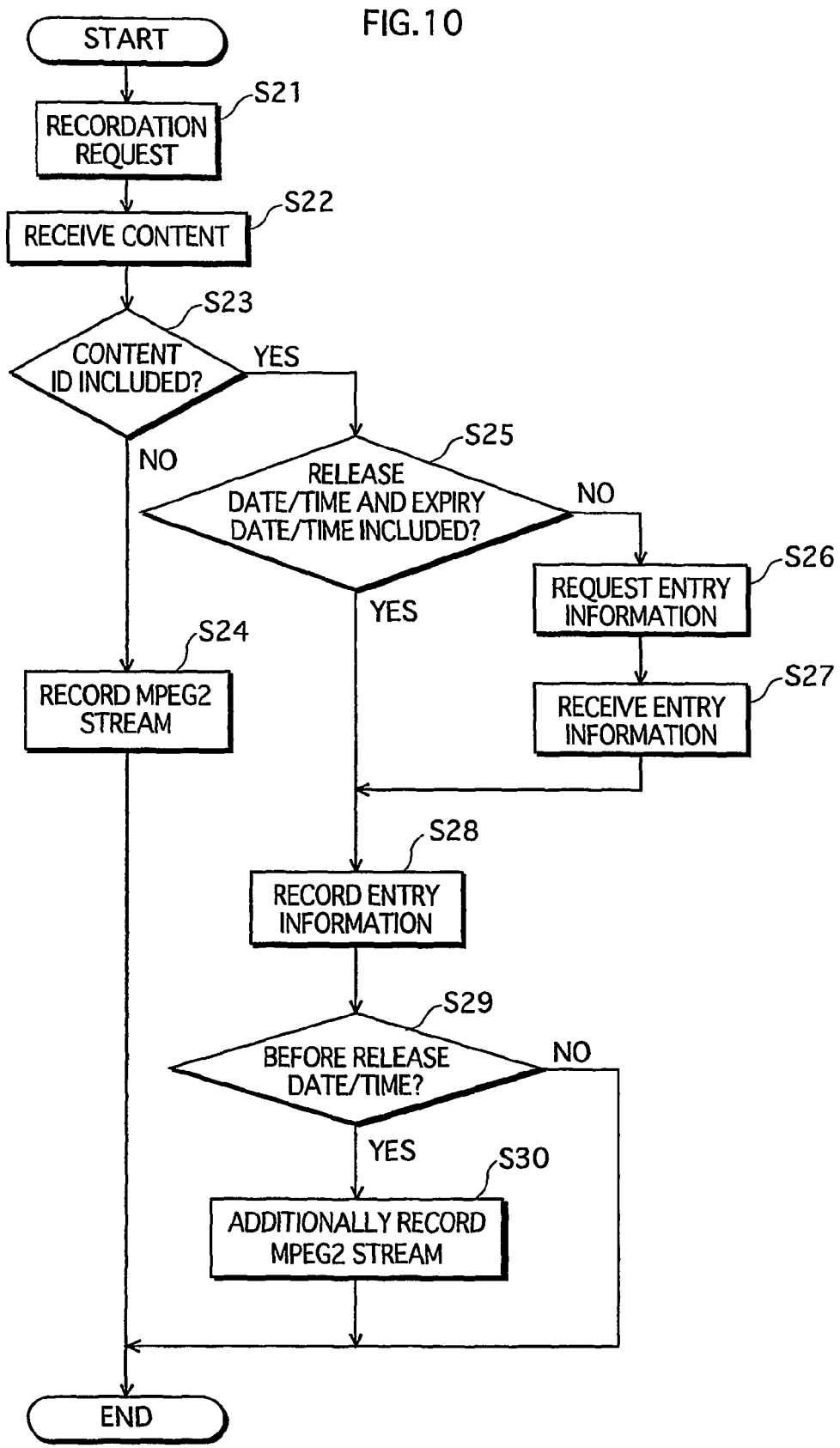
FIG. 10 is a view showing the flow of another example of operations performed by the broadcast recording system 1 for recording a content that is provided through the broadcast service.

In the operation flow shown in FIG. 9, the recording apparatus 30 records the content in form of MPEG2 stream to the hard disk 104 when there enough free storage space left in the hard disk 104. FIG. 10 shows different operations to further save the storage space of the hard disk 104.

FIG. 10 is a view showing the flow of another example of operations performed by the broadcast recording system 1 according to the embodiment 1 for recording a content that is provided through the broadcast service. The operations shown in FIG. 10 differ from the ones shown in FIG. 9 in that the steps S31-S34 are removed, and steps S29 and S30 are added.

The following describes the operations different from the ones shown in FIG. 9.

When informed in the step S25 that the release date/time and the expiry date/time are both acquired (S25: Yes), the recordation judging unit 111 unconditionally instructs the entry information recording unit 106 to record the entry information to the hard disk 104 (S28).

Further, when the release date/time is not yet arrived at the time of recording the entry information (S29: Yes), the recordation judging unit 111 controls the switch 102 to record the MPEG2 stream to the hard disk 104, additionally to the entry information having been already recorded (S30).

Through the above operations, the recording apparatus 30 always records entry information when duly receiving the entry information along with the MPEG2 stream of the content. Consequently, the storage space of the hard disk 104 is saved significantly, which enables recording of a greater number of contents.

Further, the recording apparatus records a broadcast content in addition to the recordation information when the release date/time is not yet arrived and thus a corresponding content is not yet available for on-demand distribution at the time of recording. Consequently, time-shift viewing of the content is possible even before the release date/time.

1.6 Operations for Recordation Management by Recording Apparatus 30

It should be noted that a content identical to a broadcast content is not available for on-demand distribution at all times. That is to say, in the case where the user requests to view a content some time after recording the content to the hard disk 104, the requested content may not be viewed as a result of that the on-demand service no longer provides the requested content. In order to avoid such an undesirable case, the recording apparatus 30 of the embodiment 1 collectively manages all the pieces of entry information based on the release dates/times and expiry dates/times.

Figure 11:
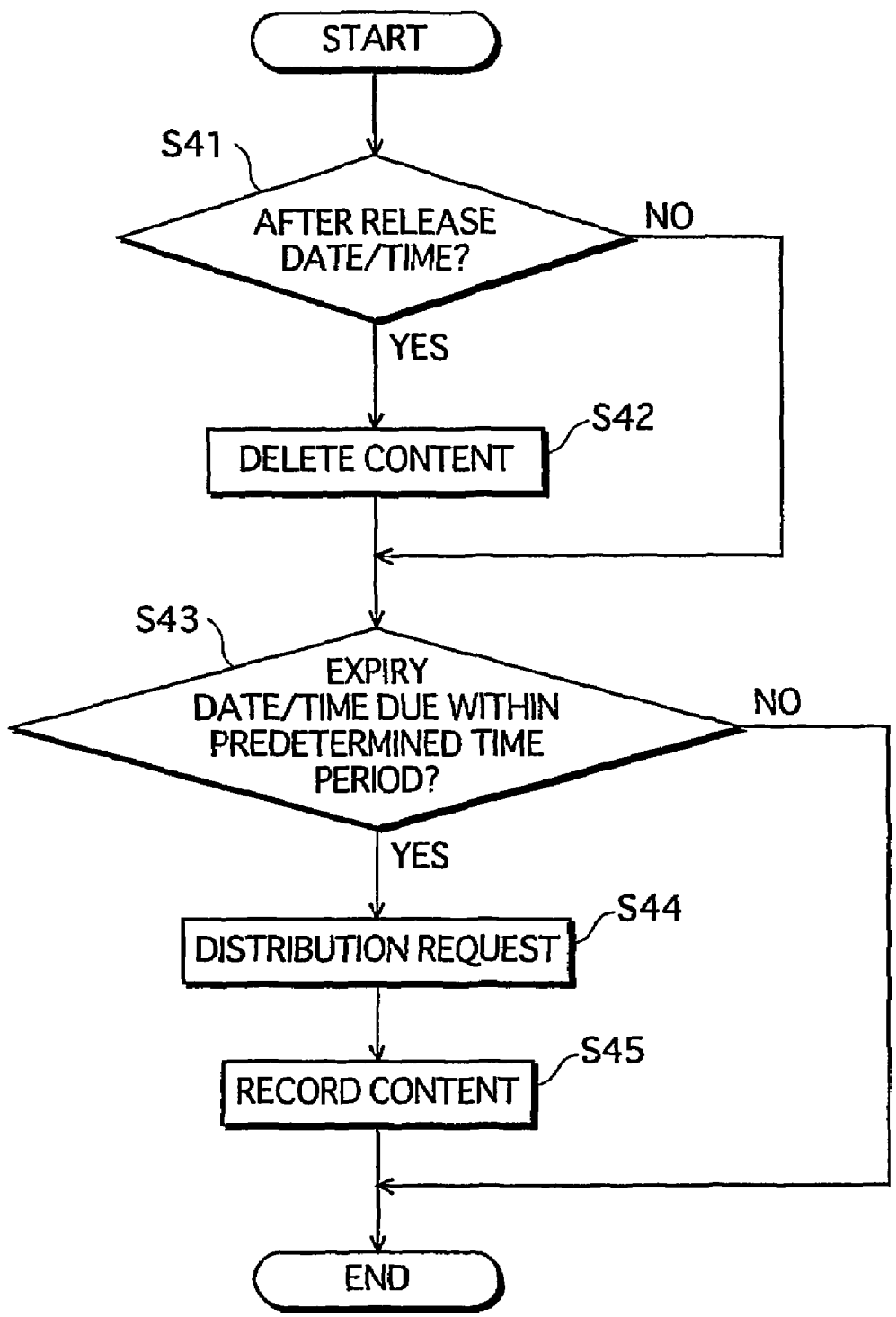
FIG. 11 is a view showing the flow of operations performed by the recording apparatus 30 for managing recorded contents.

FIG. 11 is a view showing the flow of operations performed by the recording apparatus 30 of the embodiment 1 for managing recorded contents.

The following describes the operations performed by the recording apparatus 30 to manage recorded contents.

The release date/time monitoring subunit 116 of the available-period monitoring unit 112 compares the current date/time with the release date/time shown by entry information that is recorded in the hard disk 104. When the release date/time is reached (S41: Yes), the release date/time monitoring subunit 116 deletes the MPEG2 stream that corresponds to the entry information (S42).

Further, the expiry date/time monitoring subunit 117 of the available-period monitoring unit 112 compares the current date/time with the expiry date/time shown by entry information that is recorded in the hard disk 104. When it is a predetermined time period until the expiry date/time (for example, the predetermine time period is a time period taken for transmission of the content) (S43, Yes), the available-period monitoring unit 112 instructs the requesting unit 107 to issue a request for distribution of the content identified by the entry information (S44). In addition, the available-period monitoring unit 112 instructs the CATV tuner 108, the TS decoder 109, and the switch 102 to record an MPEG2 stream distributed in response to the distribution request (S45).

Through the above operations, in the case of receiving and recording entry information and an MPEG2 stream before the release date/time, the recording apparatus 30 deletes the MPEG2 stream when the release date/time comes. Consequently, the storage space of the hard disk 104 is saved.

Further, in the case where a content has an expiry date/time for the on-demand distribution, the recording apparatus 30 acquires the content from the distributing apparatus prior to the expiry date/time and records the acquired content to the hard disk 104. Consequently, it is ensured that the user can view playback of the content at any desired time.

1.7 Playback Operations Performed by Recording Apparatus

Next, description is given to operations performed by the recording apparatus 30 of the embodiment 1 for the user to view a recorded content.

Figure 12:
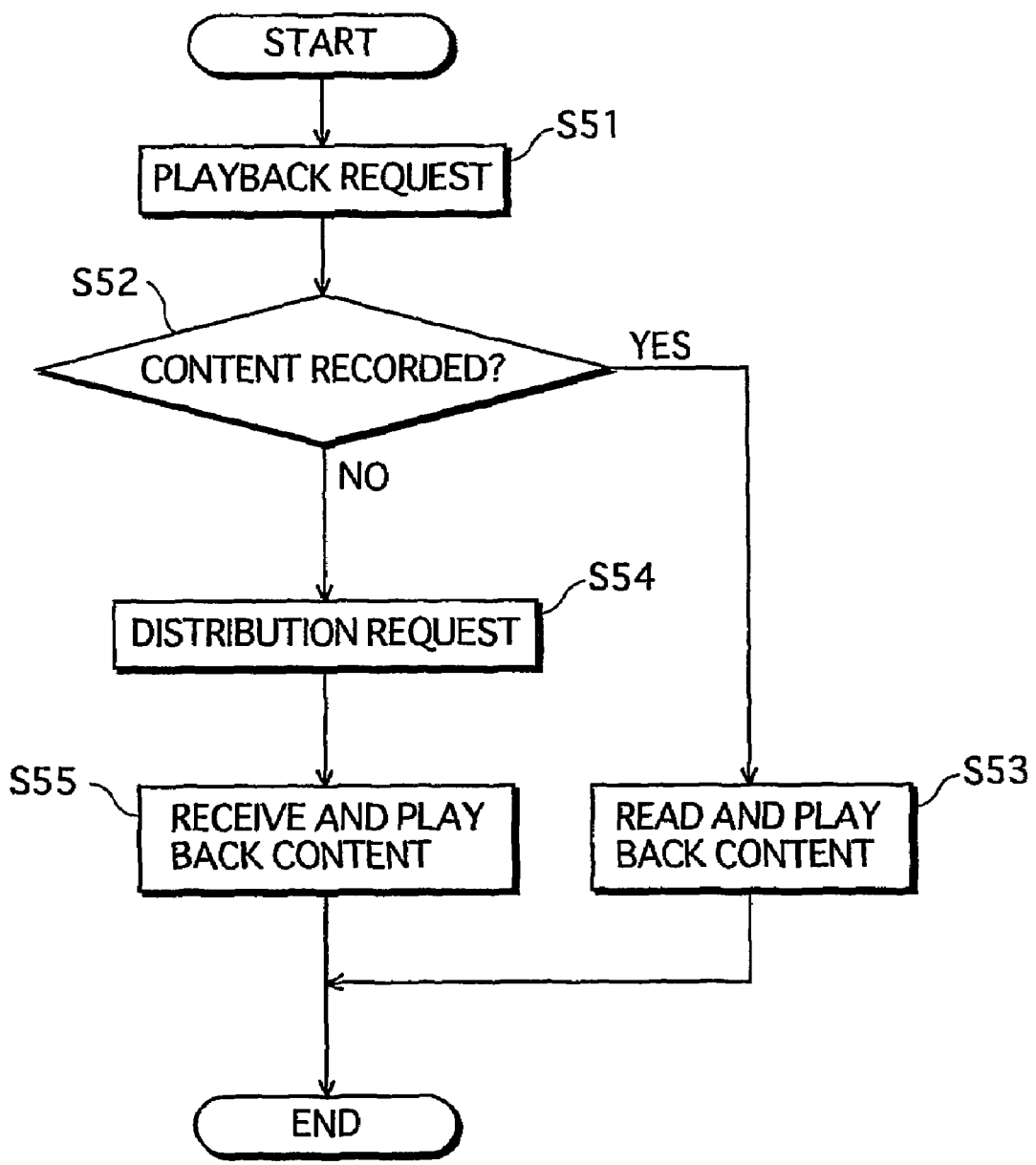
FIG. 12 is a view showing the flow of operations performed by the recording apparatus 30 when the user views a recorded content.

FIG. 12 is a view showing the flow of operations performed by the recording apparatus 30 of the embodiment 1 when the user views a recorded content.

When playback of a content is requested by a user operation (S51), the CPU 105 judges whether an MPEG stream of the requested content is recorded in the hard disk 104. Judging that the MPEG2 stream of the content is recorded in the hard disk 104 (S52: Yes), the CPU 105 controls the switch 102 and the output unit 103 to read the MPEG2 stream and display the read MPEG2 stream on the television set (S53).

On the other hand, when the MPEG2 stream of the requested content is not recorded in the hard disk 104 (S52: No), the requesting unit 107 generates a viewing request message using the content ID that is shown by the entry information of the requested content, and transmits the viewing request message to the distributing apparatus 12 via the CATV cable (S54). Then, the receiving unit 101 receives an MPEG2 stream that is on-demand distributed in response to the viewing request message, and the CPU 105 controls the switch 102 and the output unit 103 to display the received MPEG2 stream on the television set (S55).

Through the above operations, the recording apparatus 30 of the embodiment 1 ensures that a broadcast content can be played back anytime after the broadcasting regardless of whether the hard disk 104 stores an MPEG2 stream of the content or entry information of the content without the MPEG2 stream.

Embodiment 2

Overview

Hereinafter, description is given to a broadcast recording system 2 according to an embodiment 2 of the present invention. The broadcast recording system 2 provides a broadcast service by way of terrestrial analog broadcasting, and an on-demand service via the Internet.

<Structure>

2.1 System Configuration

Figure 13:
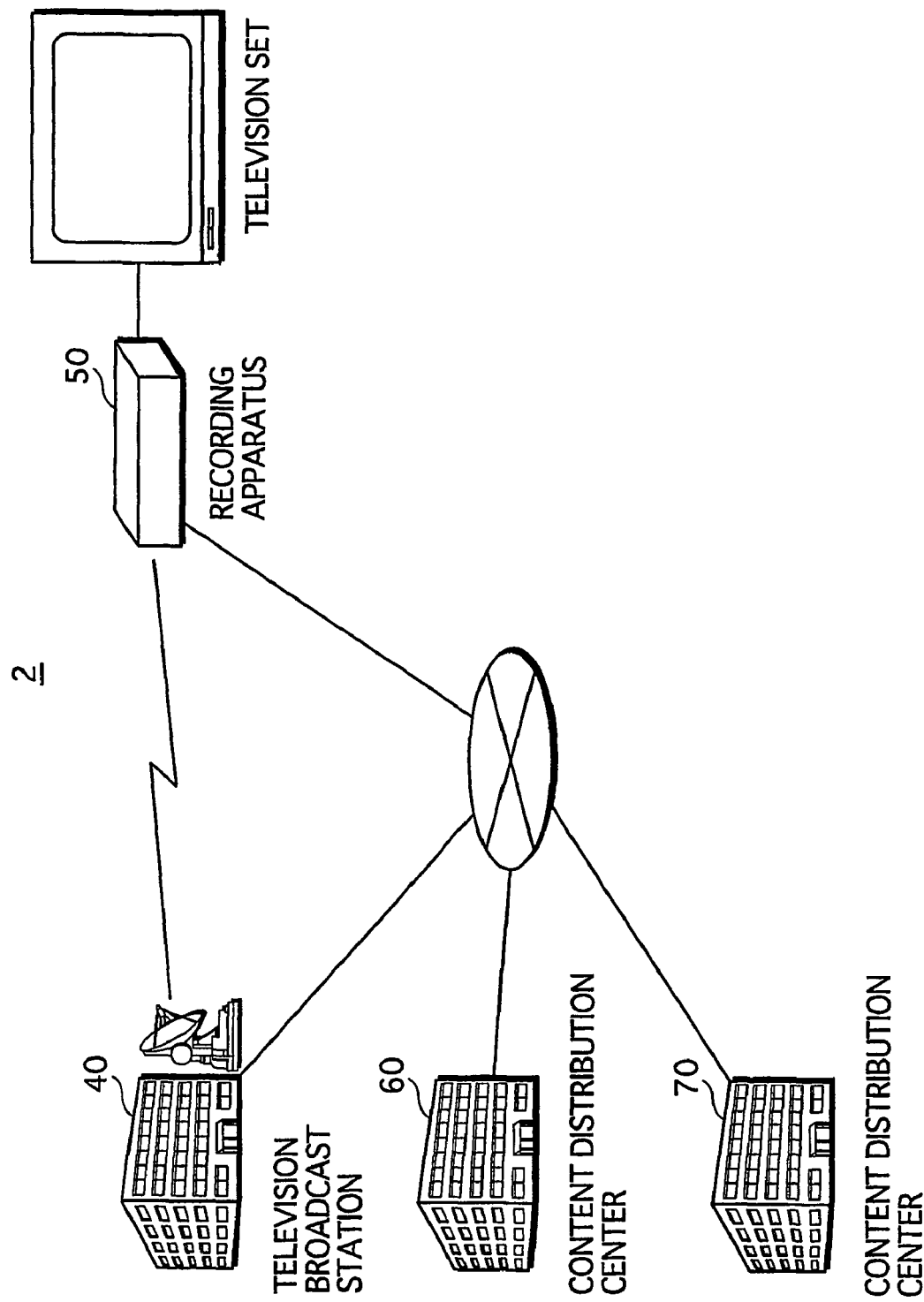
FIG. 13 is a view showing the configuration of a broadcast recording system 2 according to an embodiment 2 of the present invention.

FIG. 13 is a view showing the configuration of the broadcast recording system 2 according to the embodiment 2 of the present invention.

The broadcast recording system 2 is composed of a television broadcast station 40, a recording apparatus 50, and a content distribution centers 60 and 70. According to the broadcast recording system 2, the television broadcast station 40 broadcasts contents, and the recording apparatus 50 receives and records the contents. The television broadcast station 40, the recording apparatus 50, and the content distribution centers 60 and 70 are mutually connected via the Internet.

The television broadcast station 40 broadcasts contents based on the NTSC standard according to a predetermined broadcast timetable.

Each of the content distribution centers 60 and 70 is a so-called ISP (Internet Service Provider), for example, and accumulates contents each identical to a content broadcast through the broadcast service, and distributes accumulated contents on-demand to a recording apparatus owned by a subscriber via the Internet.

The recording apparatus 50 receives and records contents broadcast from the television broadcast station 40 through the broadcast service. In addition, the recording apparatus 50 requests the distribution centers 60 and 70 to distribute contents, and receives distributed contents via the Internet.

2.2 Television Broadcast Station 40

Hereinafter, description is given to the detailed structure of the television broadcast station 40.

Figure 14:
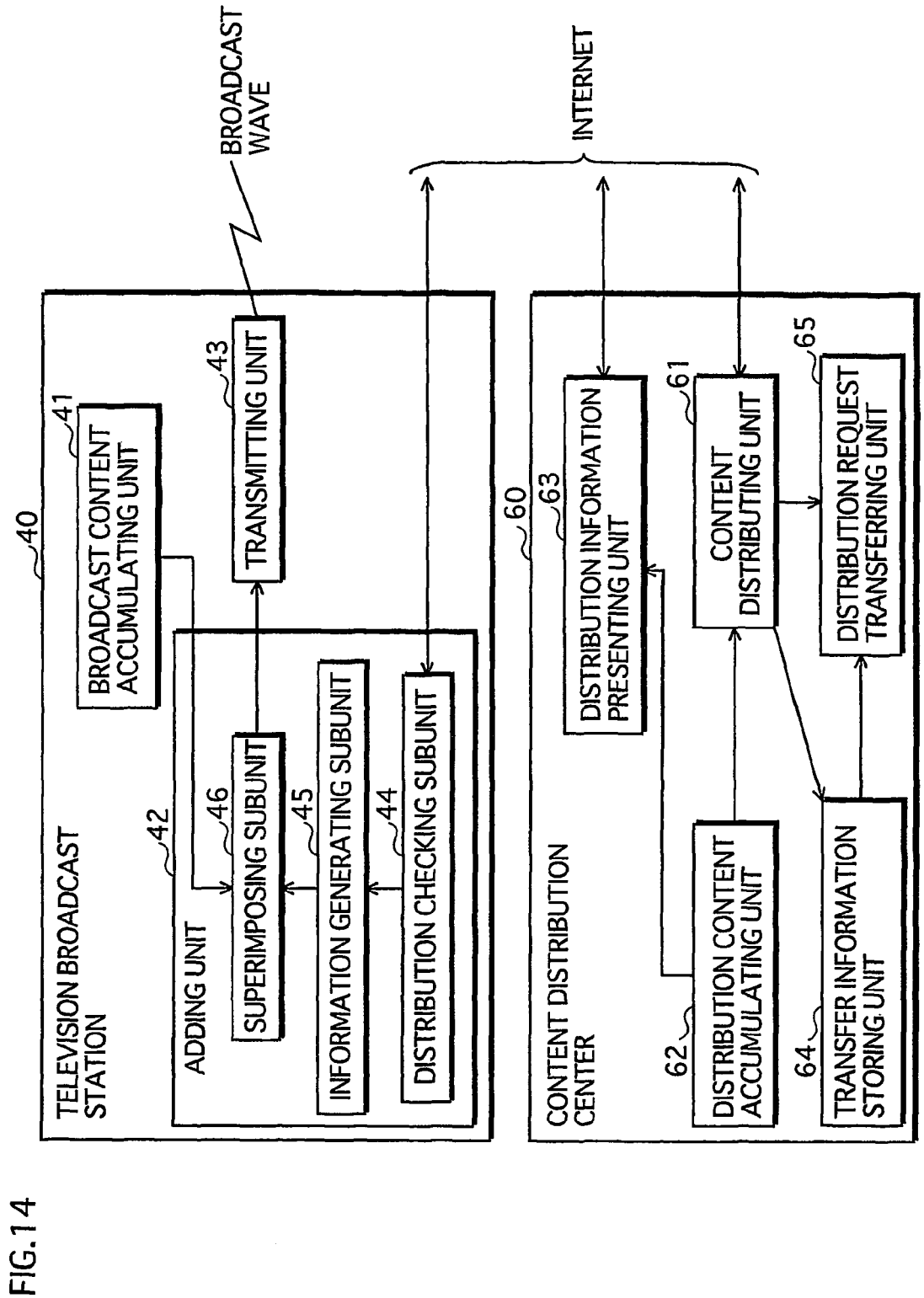
FIG. 14 is a view showing the structures of a television broadcast station 40 and a content distribution center 60 according to the embodiment 2 of the present invention.

FIG. 14 is a view showing the structures of the broadcast station 40 and the content distribution center 60 according to the embodiment 2 of the present invention.

The television broadcast station 40 includes a broadcast content accumulating unit 41, an adding unit 42, and a transmitting unit 43, and broadcasts contents based on the NTSC standard at scheduled times according to the predetermined broadcast timetable. When broadcasting a content to which an identical content is allowed to be distributed by the content distribution center 60 or 70, the television broadcast station 40 superimposes to the broadcast wave, entry information that includes a URL (Uniform Resource Locator) showing a storage location of the content on the Internet.

The broadcast content accumulating unit 41 accumulates contents to be broadcast through the broadcast service, and outputs an NTSC signal representing a content at the time of broadcasting.

The adding unit 42 includes functional blocks of a distribution checking subunit 44, an information generating subunit 45, and a superimposing subunit 46. To broadcast a content to which an identical content is available for on-demand distribution, the adding unit 42 superimposes corresponding entry information onto a broadcast wave carrying the content to be broadcast.

The distribution checking subunit 44 transmits, to the content distribution centers 60 and 70, a broadcast date/time of the content to be broadcast, and receives information as to whether an identical content is available for on-demand distribution. When the distribution information presenting unit 63 informs that the identical content is available for on-demand distribution, the distribution checking subunit 44 acquires from the distribution information presenting unit 63, a URL showing a storage location of the distribution content, and quality information composed of resolution and bit rate of the distribution content, and outputs the acquired information to the information generating subunit 45.

Figure 15:
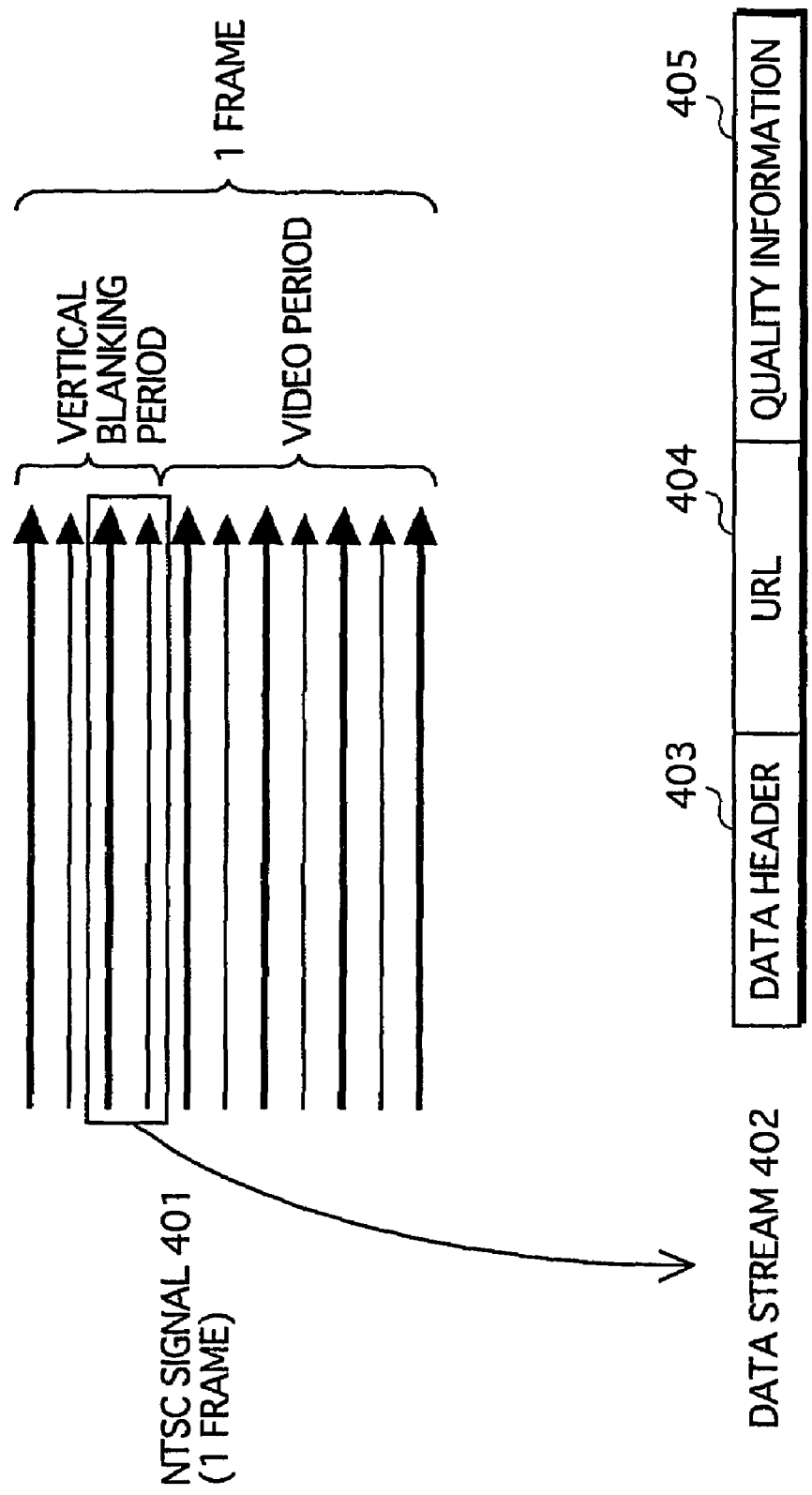
FIG. 15 is a view showing the data structures of entry information according to the embodiment 2 and of an NTSC signal 401 into which the entry information is superimposed.

The information generating subunit 45 generates entry information shown in FIG. 15 using the information outputted from the distribution checking subunit 44.

When broadcasting a content to which an identical content is available for on-demand distribution, the superimposing subunit 46 superimposes entry information generated by the information generating subunit 45 to an NTSC signal that is outputted from the broadcast content accumulating unit 41 for the transmitting unit 43 to broadcast.

The transmitting unit 43 broadcasts the NTSC signal outputted from the superimposing subunit 46 at scheduled times according to the broadcast table.

FIG. 15 is a view showing the data structures of entry information according to the embodiment 2 and of an NTSC signal 401 into which the entry information is superimposed.

The NTSC signal 401 corresponds to one frame, and a data stream 402 is superimposed into a part of the vertical blanking period. The data stream 402 contains a data header 403 and entry information that is composed of a URL 404 and quality information 405.

The URL 404 shows a storage location of a distribution content on the Internet, and the quality information 405 shows the resolution and bit rate at which the content is distributed.

The entry information is superimposed to each frame of the content. That is to say, the entry information may be acquired any time during broadcasting of the content.

The technique to superimpose a data stream into a vertical blanking period of an NTSC signal is well known in the art employed for example in character broadcasting, and thus detailed description thereof is omitted.

With the above structure, when broadcasting a content to which an identical content is available for on-demand distribution, the television broadcast station 40 broadcasts entry information by superimposing the entry information into an NTSC signal carrying the content.

2.3 Content Distribution Center 60

Next, description is given to the detailed structure of the content distribution center 60.

The content distribution center 60 is composed of a content distributing unit 61, a distribution content accumulating unit 62, a distribution information presenting unit 63, a transfer information storing unit 64, and a distribution request transferring unit 65.

The content distribution center 60 prepares a plurality of MPEG2 streams for one content with different image qualities, i.e. different resolutions and bit rates, and thus, is capable of providing a suitable video content depending on the resolution of the recording apparatus to which the content is distributed or the bit rate of the communication line via which the content is distributed.

The content distributing unit 61 receives from the recording apparatus 50, a viewing request packet shown in FIG. 16, and reads a requested content from the distribution content accumulating unit 62, and distributes the read content to the request source, i.e. the recording apparatus 50. In the case where the content requested by the viewing request packet is not stored in the distribution content accumulating unit 62, the content distributing unit 61 informs the distribution request transferring unit 65 that the requested content is not found.

The distribution content accumulating unit 62 is a large-capacity recording device storing distribution contents in MPEG2 streams. To be more specific, the distribution content accumulating unit 62 stores a plurality of MPEG2 streams for one content with different image qualities such as resolutions and bit rates. The distribution content accumulating unit 62 further stores, for each of the stored contents, distribution information composed of a broadcast date/time, an URL, and quality information of a highest image quality MPEG2 stream among all the MPEG2 streams of a corresponding content.

The distribution information presenting unit 63 receives from the television broadcast station 40, a broadcast date/time of a content to be broadcast, and searches the distribution content accumulating unit 62 for distribution information showing a matching broadcast date/time. When there is matching distribution information, the distribution information presenting unit 63 transmits a URL and quality information that is included in the distribution information to the distribution checking subunit 44 of the television broadcast station 40, thereby informing that the content to be broadcast is available for on-demand distribution.

There may be a case where a content stored in the distribution accumulating unit 62 is transferred to another content distribution center by the administrator of the content distribution center 60 in order to secure the available storage capacity or because the expiry date/time of the content is passed. The transfer information storing unit 64 stores a URL of a location to which a content is transferred. To be more specific, the transfer information storing unit 64 stores, for each content transferred, a URL of a content distribution center to which being a destination of transmission or transfer or of a proxy server to which a copy of the content is cached.

When receiving information from the content distributing unit 61 that the requested content is not found, the distribution request transferring unit 65 retrieves a URL showing a transfer destination of the requested content from the transfer information storing unit 64, and transfers the viewing request packet to the retrieved URL via the Internet, thereby requesting to transmit the requested content to the distributing apparatus 50.

With the above structure, the content distribution center 60 transmits the requested content to the recording apparatus 50.

Note that the content distribution center 70 has a similar structure to that of the content distribution center 60.

2.4 Recording Apparatus 50

Next, description is given to the structure of the recording apparatus 50.

Figure 17:
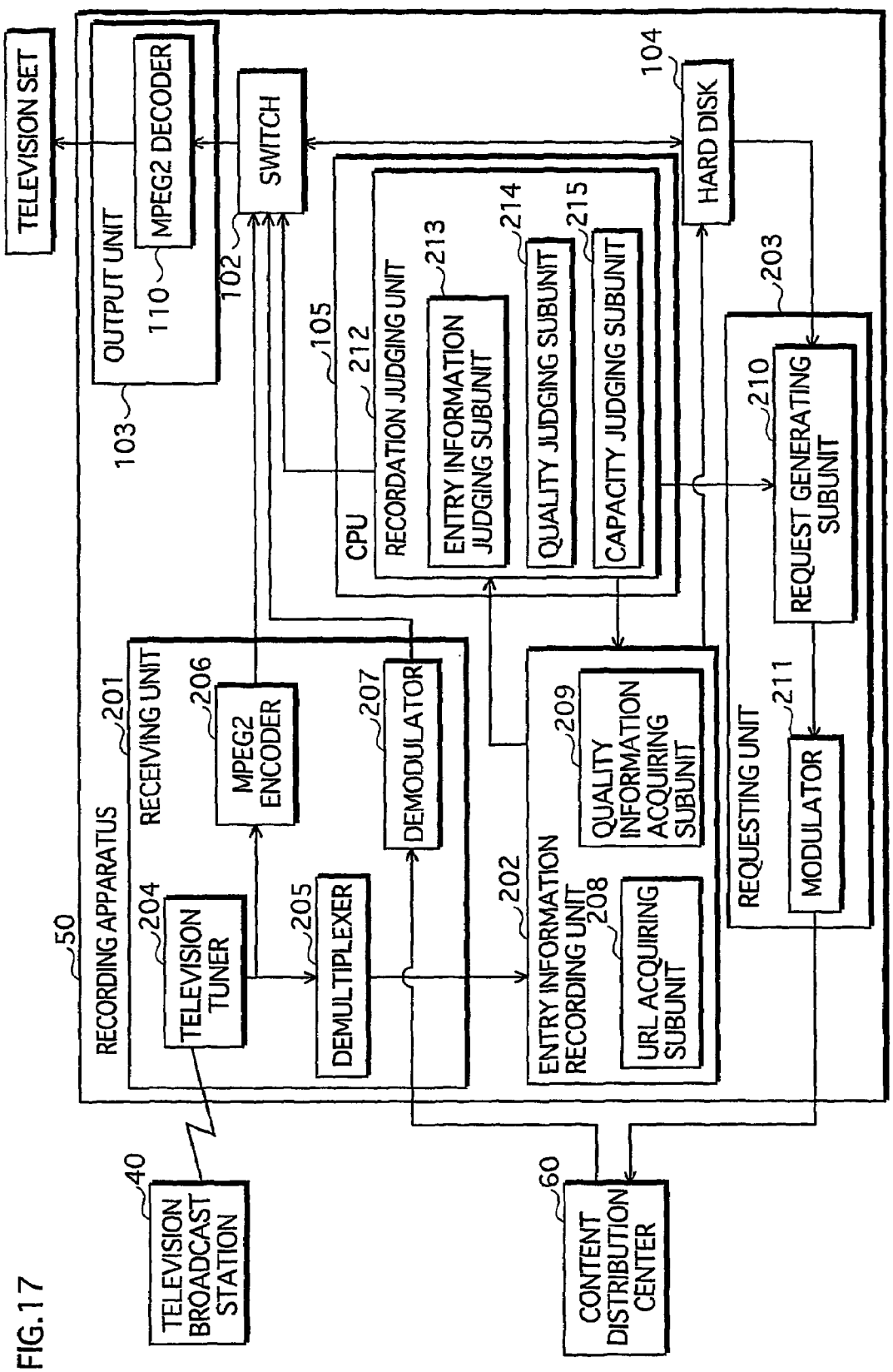
FIG. 17 is a view showing the structure of a recording apparatus 50 according to the embodiment 2 of the present invention.

FIG. 17 is a view showing the structure of the recording apparatus 50 according to the embodiment 2 of the present invention.

The recording apparatus 50 is composed of a receiving unit 201, a switch 102, an output unit 103, a hard disk 104, a CPU 105, an entry information recording unit 202, and a requesting unit 203.

Note that those components denoted by the same reference numerals as in the recording apparatus 30 are similar to the corresponding components, and thus description thereof is omitted.

The receiving unit 201 is a functional block for receiving a content broadcast or distributed from the television broadcast station 40, or the content distribution center 60 or 70. Specifically, the receiving unit 201 is composed of a television tuner 204, a demultiplexer 205, an MPEG2 encoder 206, and demodulator 207.

The television tuner 204 receives a broadcast wave from the television broadcast station 40, and tunes to a user selected channel to output an NTSC signal received on the channel.

The demultiplexer 205 extracts a data stream from the NTSC signal corresponding to the vertical blanking period and outputs the extracted data stream to the entry information recording unit 202.

The MPEG2 encoder 206 encodes the NTSC signal to an MPEG2 stream in compliance with the MPEG2 standard, and outputs the resulting MPEG2 stream to the switch 102.

The demodulator 207 is connected to a downstream of the Internet, and extracts an MPEG2 stream from input packets received via the Internet, and outputs the MPEG2 stream to the switch 102.

The entry information recording unit 202 includes a URL acquiring subunit 208 and a quality information acquiring subunit 209. The URL acquiring subunit 208 extracts a URL showing a storage location of a content from the data stream that is demultiplexed from the received NTSC signal, and the quality information acquiring subunit 209 extracts quality information that is composed of a resolution and a bit rate of the content. With the above operations, the entry information recording unit 202 acquires entry information.

Further, the entry information recording unit 202 informs the recordation judging unit 212 as to whether each of the URL and the quality information has been acquired. Further, in response to a recordation instruction from the recordation judging unit 212, the entry information recording unit 202 records the entry information to the hard disk 104.

The requesting unit 203 is composed of a request generating subunit 210 and a modulator 211, and issues to the content distribution center 60, a request for on-demand distribution of a content.

The requesting unit 203 issues such a distribution request based on the resolution and the bit rate shown in the entry information that a content is to be distributed at a bit rate and a resolution suitable to the recording apparatus 50. Consequently, it is ensured that the user can view playback of the content without frame skips or playback rate fluctuations. In addition, the user may view a content that is played back at a higher bit rate and higher image quality than a corresponding broadcast content.

To play back a content that is not stored in the hard disk 104 although corresponding entry information is stored, the request generating subunit 210 generates a viewing request packet shown in FIG. 16 under control by the CPU 105. The viewing request packet is generated with reference to the entry information that is read from the hard disk 104 and the resolutions and bit rates that the recording apparatus 50 is provided for. The request generating subunit 210 then outputs the generated viewing request packet to the modulator 211.

The modulator 211 modulates the viewing request packet into a packet suitable for output, and then outputs the output packet to an upstream of the Internet.

The CPU 105 controls playback of a content in a similar manner to the embodiment 1.

Further, the CPU 105 performs the function of the recordation judging unit 212 by executing a computer program stored for example in a ROM or a hard disk, thereby controlling recordation of cornets.

The recordation judging unit 212 is a functional block that includes an entry information judging subunit 213, a quality judging subunit 214, and a capacity judging subunit 215, and judges, when recordation of a content is requested by a user operation or by a programmed recording schedule, whether to record the requested content and corresponding entry information to the hard disk 104. When the entry information judging subunit 213, the quality judging subunit 214, and the capacity judging subunit 215 judge to record the requested content, the recordation judging unit 212 controls the switch 102 to record the content to the hard disk 104. On the other hand, when it is judged to record the entry information, the recordation judging unit 212 instructs the entry information recording unit 202 to record the entry information to the hard disk 104.

The entry information judging subunit 213 receives information from the entry information recording unit 202 as to whether each of the URL and the quality information is acquired. When informed that the URL is not acquired, the entry information judging subunit 213 judges to record the content.

The capacity judging subunit 215 is a functional block that is similar to the capacity judging subunit 115 of the embodiment 1.

The quality judging subunit 214 compares, when the capacity judging subunit 215 judges to record the content, the image quality of the received content (meaning, in the embodiment 2, the MPEG2 stream generated by encoding the NTSC signal) with the image quality shown by the quality information. When the image quality shown by the quality information is higher, the quality judging subunit 214 overrides the judgment of the capacity judging subunit 215 so that entry information is to be stored instead of the content.

With the above structure, when the hard disk 104 does not have enough free storage space to record a content, the recording apparatus records entry information of the content. Since the entry information is recorded, the recording apparatus is allowed to receive a content that is identical to the broadcast content, so that the user can view the distributed content at a later time.

Consequently, the storage space of the hard disk is significantly saved in comparison with storing all the contents broadcast.

Further, the recording apparatus compares image qualities of a broadcast content and a content to be on-demand distributed shown by entry information that is acquired along with the broadcast content, and selects a content that is better in image quality.

Consequently, the user is allowed to view a content that is better in image quality.

Further, in the case where a plurality of, concurrently broadcast contents are requested to be recorded by the user or by a programmed recording schedule, the CPU 105 controls each functional block as follows. First, the television tuner 204 is controlled to select a channel on which a first content is broadcast and acquire an NTSC signal broadcast on the channel. The entry information recording unit 202 is controlled to acquire entry information from the NTSC signal and record the acquired entry information to the hard disk 104. The CPU 105 then controls the television tuner 204 to switch to a channel on which a second content is broadcast, and to acquire an NTSC signal broadcast on the channel. The entry information recording unit 202 is then controlled to acquire entry information from the NTSC signal, and record the acquired entry information to the hard disk 104. The CPU 105 further performs similar control to record entry information of a third content and thereafter.

As described above, when a plurality of concurrently broadcast contents are requested to be recorded, the recording apparatus sequentially records entry information of each content instead of MPEG2 streams. With this arrangement, the recording apparatus allows the user to view all of the requested contents at a later date.

<Operations>

Next, description is given to the flow of operations performed by the broadcast recording system 2 having the above structure.

2.5 Recordation Operations Performed by Recording Apparatus 50

Now, description is given to operations performed by the recording apparatus 50 for receiving a content and recording the content to the hard disk for the purpose of time-shift viewing.

Figure 18:
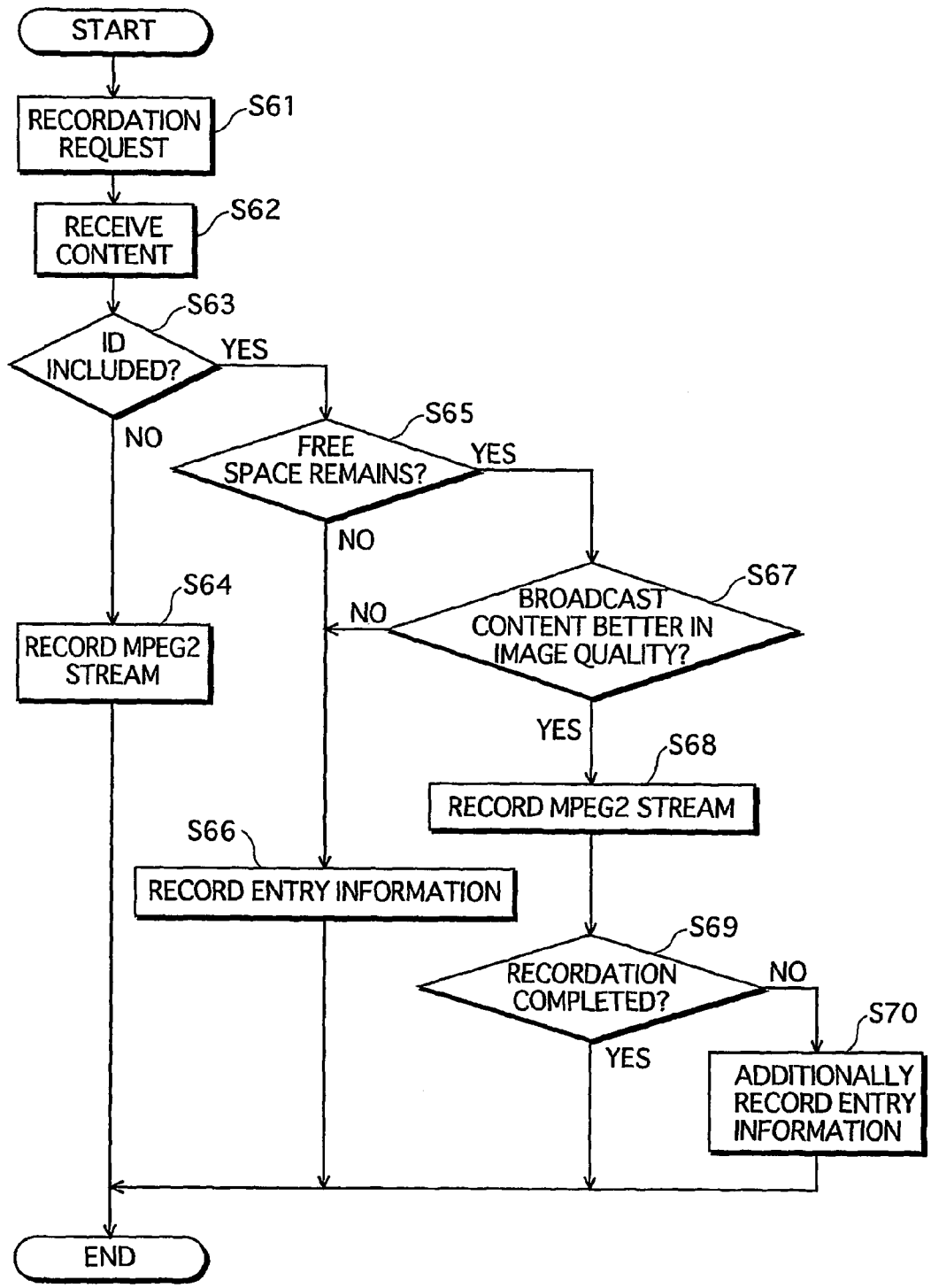
FIG. 18 is a view showing the flow of operations performed by the broadcast recording system 2 for recording a content that is provided through the broadcast service.

FIG. 18 is a view showing the flow of operations performed by the broadcast recording system 2 according to the embodiment 2 of the present invention for recording a content that is provided through the broadcast service.

When recordation of a content is requested by a user operation or by a programmed recording schedule (S61), the television tuner 204 selects an NTSC signal on a user selected channel from among all the signals received with the antenna, and outputs the selected signal to the demultiplexer 205 and the MPEG2 encoder 206 (S62).

The MPEG2 encoder 206 extracts video and audio data from the NTSC signal, converts the extracted data to an MPEG2 stream, and outputs the resulting MPEG2 stream to the switch 102.

The demultiplexer 205 separates a data stream that is superimposed to the NTSC signal corresponding to a vertical blanking period, and outputs the data stream to the entry information recording unit 202. The entry information recording unit 202 attempts to acquire a URL and quality information with the URL acquiring subunit 208 and the quality information acquiring subunit 209. The entry information recording unit 202 then informs the recordation judging unit 212 as to whether each information item is acquired.

When informed by the entry information recordation unit 202 that the URL is not acquired (S63: No), the entry information judging subunit 213 of the recordation judging unit 212 judges that a content corresponding to the requested content is not available for on-demand distribution, and thus controls the switch 102 to record the MPEG2 stream to the hard disk 104 (S64), and completes the recordation.

On the other hand, when informed that the URL is acquired (S63: Yes), the capacity judging subunit 215 of the recordation judging unit 212 compares a free storage space of the hard disk 104 with a storage space required to record the requested content in form of MPEG2 stream. On judging that the free storage space of the hard disk 104 falls short (S65), the capacity judging subunit 215 instructs the entry information recording unit 202 to record the entry information (S66), and completes the recordation.

In contrast, when the free storage space of the hard disk 104 is greater (S65: Yes), the quality judging subunit 214 of the recordation judging unit 212 then compares the image quality shown by the entry information with the image quality of the MPEG2 stream generated by encoding the received NTSC signal (S67).

On judging that the image quality shown by the entry information is higher (S67: No), the quality judging subunit 214 instructs the entry information recording unit 202 to record the entry information to the hard disk 104 (S66) and completes the recordation.

On the other hand, on judging that the image quality of the MPEG2 stream is higher (S67: Yes), the quality judging subunit 214 controls the switch 102 to record the MPEG2 stream to the hard disk 104 (S68). In the case where the content being recorded is longer than the predetermined time period, the hard disk 104 runs out of the storage space in the middle of recordation process (S69: No). In such a case, the recordation judging unit 212 instructs the entry information recording unit 202 to record the entry information (S70).

Through the above operations, even if enough storage space is not left in the hard disk 104 for recording an MPEG2 stream of a broadcast content, the recording apparatus 50 records, instead of MPEG2 stream, entry information acquired from the received NTSC signal. Since the entry information is recorded, the recording apparatus 50 is allowed to receive on-demand distribution of the content, so that the user can view the content at a later time.

Further, in the case where a content is programmed in advance by a user to be recorded, a total record time is specifically known. Consequently, comparison of the free storage space of the hard disk 104 and the storage space required for recording the content is reliably made. As a result, such an undesirable occurrence is eliminated that the content is recorded only halfway through due to the shortage of the available memory of the hard disk 104.

In the case where a total record time is not surely known before actual recording, it is possible that the hard disk 104 runs out of the free storage space halfway through the recordation process. In such a case, however, the recording apparatus records entry information, which is significantly smaller in size than the content. As long as the entry information is recorded, the recording apparatus is allowed to receive an identical content provided through the on-demand distribution service. This leads to eliminate undesirable possibility that the user can not view the content through to the end.

Further, the recording apparatus compares, using entry information acquired with a content provided through the broadcast service, image qualities of the broadcast content and of an on-demand distribution content. When the broadcast content is better in image quality, the recording apparatus records the content that is acquired from the received broadcast wave. On the other hand, when the distribution content is better in image quality, the recording apparatus records entry information that is acquired from the received broadcast wave. Consequently, the user is allowed to view at a later date, whichever content is better in the image quality.

2.6 Operations by Content Distribution Centers 60 and 70 for Content Distribution Now, description is given to operations performed by the content distribution centers 60 and 70 for distributing a content.

FIG. 19 is a view showing the flow of the operations performed by the broadcast recording system 2 according to the embodiment 2 of the present invention to provide a content through the on-demand distribution service.

A viewing request packet transmitted from the recording apparatus 50 is delivered via the Internet to the content distribution center 60 that is specified by the URL as a transmission destination (step S71).

When the content distribution center 60 receives the viewing request packet, the content distributing unit 61 searches all the MPEG2 streams stored in the distribution content accumulating unit 62 for an MPEG2 stream that is specified by the URL included in the viewing request packet.

When the distribution content accumulating unit 62 stores the specified MPEG2 stream (S72: Yes), the content distributing unit 61 acquires the MPEG2 stream from the distribution content accumulating unit 62, and transmits the acquired MPEG2 stream to the recording apparatus 50 via the Internet (S73).

There may be a case where an administrator of the content distribution center 60 transfers a content stored in the distribution content accumulating unit 62 to another content distribution center (for example, the content distribution center 70) in order to secure the storage space of the distribution content accumulating unit 62. That is to say, there may be a case where the distribution content accumulating unit 62 no longer stores the specified content (step S72: No). In that case, the content distributing unit 61 informs the distribution request transferring unit 65 that the MPEG2 stream of the requested content is not acquired.

In response, the distribution request transferring unit 65 searches the transfer information storing unit 64 to judge whether a transfer destination of the requested content is stored. When the transfer destination of the requested content is not found (S74: No), the distribution request transferring unit 65 informs the recording apparatus 50, which is the transmission source of the viewing request packet, that the requested content is not available (S75).

On the other hand, when the transfer destination of the requested content is found in the transfer information storing unit 64 (S74: Yes), the distribution request transferring unit 65 transfers the viewing request packet to the URL of the transfer destination (for example, the content distribution center 70) via the Internet, thereby requesting to distribute the requested content to the recording apparatus 50 (S76).

On receiving the viewing request packet transferred from the content distribution center 60 (S77), the content distribution center 70 operates as follows. First, the content distributing unit acquires an MPEG2 stream of the requested content from the content accumulating unit, and then transmits the MPEG2 stream to the recording apparatus 50, which is the request source (S78).

Through the above operations, the content distribution center is able to provide a content requested by the recording apparatus even if the requested content is not stored within the distribution center.

Consequently, when the recording apparatus stores entry information without an MPEG2 stream of the content, and when the content distribution center to which the recording apparatus made a distribution request no longer stores the requested content, it is still ensured that the user of the recording apparatus acquires the requested content and view the content.

Note that the content distribution center 70 received the viewing request packet may perform the similar operations to the content distribution center 60 (the searches for the requested content and the transfer information), so that and the viewing request packet is further transferred to yet another content distribution center.

3. Modifications

Up to this point, the present invention has been described by way of the above embodiments 1 and 2. It is naturally appreciated, however, that the present invention is in no way limited to those specific embodiments and modifications such as the following are still within the scope of the present invention.

(1) The present invention may be embodied as the methods described above. Further, the present invention may be embodied as computer programs realizing the methods by a computer, or digital signals representing the computer programs.

Further, the present invention may be embodied as a computer-readable recording medium storing the computer programs or the digital signals. Examples of such a recording medium include a flexible disk, a hard disk, CD-ROM, MO, DVD, DVD-ROM, DVD-RAM, BD (Blu-ray Disc) and a semiconductor memory. Further, the present invention may be embodied as the computer program or the digital signal recorded on any recording medium mentioned above.

Still further, the present invention may be embodied as the computer programs or the digital signals transmitted via an electric communication line, wireless communications, a wired communication line, or a network typified by the Internet.

Still further, the present invention may be embodied as a computer system composed of a microprocessor and memory. The memory stores the computer programs mentioned above, and the microprocessor may operate according to the computer programs.

Still further, the programs or the digital signals may be transferred in form of a recording medium mentioned above, or via a network mentioned above, so that the programs or the digital signals may be executed by another independent computer system.

(2) The entry information according to the present invention does not necessarily have the data structure described in the above embodiments 1 and 2. Any other data structure is applicable as long as the information uniquely specifies a corresponding content for on-demand distribution.

For example, the entry information may specify a content by the channel and the date/time on which the content is broadcast. In this case, the distributing apparatus stores a table in which each content for on-demand distribution is correlated with a corresponding broadcasting channel and broadcast date/time. Consequently, the recording apparatus may make a distribution request using the broadcasting channel and broadcast date/time of a desired content.

(3) The broadcasting apparatus according to the present invention may broadcast contents to any broadcasting system other than CATV broadcasting and terrestrial analog broadcasting. For example, the broadcasting apparatus may broadcast contents by way of terrestrial digital broadcasting, BS broadcasting, BS digital broadcasting, or CS broadcasting.

(4) In the above embodiments, entry information is added to a content by multiplexing the entry information to a TS compliant with the MPEG2 standard or by superimposing the entry information to analog broadcast wave in the vertical blanking period. According to the present invention, however, a content and entry information may together broadcast by any other way. For example, entry information may be multiplexed to a TS using a data carousel scheme, which is used in digital broadcasting for data broadcasting.

(5) In the above embodiments, (i) an MPEG2 stream that is generated by encoding a content and (ii) entry information are both stored to the hard disk. Yet, it is not necessary to record the MPEG2 stream and the entry information to the same recording medium. For example, the entry information may be recorded to another recording medium such as RAM.

(6) In the above embodiments, the coding of contents for broadcasting, distribution, and recordation are performed all in compliance with the MPEG2 standard. Yet, the coding employed in the broadcast recording system of the present invention is not limited to the MPEG2 standard and may be any coding such as one in compliance with the MPEG4 standard, the H.263 standard, and the H.264 standard.

(7) The recording apparatus according to the present invention may be so structured to (i) acquire entry information attached to a broadcast content in the middle of the broadcasting and, (ii) request the distributing apparatus to distribute a content specified by the acquired entry information, so that the recording apparatus is allowed to play back the distributed content from the beginning.

With this structure, the user of the recording apparatus can view playback of a content from the beginning even if the user requests recordation of the content in the middle of the broadcasting.

(8) The recording apparatus according to the present invention may further include a restricting unit to impose restrictions on recordation of broadcast contents, and the distributing apparatus may distribute a content that is identical in substance of data but in degraded image quality.

This arrangement prevents recordation and unlimited duplication of a content that is broadcast in high image quality by way of digital broadcasting.

(9) The present invention may be any combination of the above-described embodiment and modifications.

The broadcast recording system according to the present invention achieves an effect of reducing storage space used to record broadcast contents, and thus highly applicable, for example, to a hard disk recorder for recording broadcast contents.

The invention claimed is:

1. A broadcast recording system comprising:
a broadcasting apparatus including:
an attaching unit operable to attach entry information to broadcast content that is for broadcasting, the broadcast content corresponding to a specific content of a plurality of contents each composed at least of video and audio data, the entry information specifying a distribution content of a plurality of distribution contents available for distribution by a distributing apparatus, the specified distribution content being (i) composed of video and audio data and (ii) identical to the specific content with respect to a substance of the video and audio data of the specific content; and
a broadcasting unit operable to broadcast the broadcast content with the attached entry information;
a recording apparatus including:
a receiving unit operable to receive the broadcast content with the attached entry information from the broadcasting apparatus;
an entry information recording unit operable to record, in response to a user operation requesting that the received broadcast content be recorded, the entry information attached to the received broadcast content, the entry information being recorded to a storage area; and
a requesting unit operable to request the distributing apparatus to distribute the distribution content specified by the recorded entry information; and
the distributing apparatus that distributes the specified distribution content to the recording apparatus in response to the distribution request from the requesting unit,
wherein the recording apparatus (i) receives, after broadcasting of the broadcast content corresponding to the specific content, the specified distribution content that is identical to the specific content with respect to the substance of the video and audio data of the specific content and (ii) plays back the received distribution content.

2. A recording apparatus comprising:
a receiving unit operable to receive, from a broadcasting apparatus for broadcasting broadcast contents wherein each broadcast content broadcast from the broadcasting apparatus (i) is for being broadcast together with entry information attached thereto and (ii) corresponds to a specific content composed at least of video and audio data, a broadcast content being (i) composed of video and audio data and (ii) identical to a specific content of the broadcast contents with respect to a substance of the video and audio data of the specific content, the received broadcast content being received together with attached entry information specifying a distribution content of a plurality of distribution contents available for distribution by a distributing apparatus, the specified distribution content being composed of video and audio data that is identical to the specific content with respect to a substance of the video and audio data of the specific content;
an entry information recording unit operable to record, in response to a user operation requesting that the received broadcast content be recorded, the entry information attached to the received broadcast content, the entry information being recorded to a storage area; and
a requesting unit operable to request the distributing apparatus to distribute the distribution content specified by the recorded entry information,
wherein the recording apparatus plays back the distribution content that is distributed by the distributing apparatus in response to the distribution request.

3. The recording apparatus according to claim 2,
wherein the broadcast content that corresponds to the specific content and the distribution content specified by the entry information that corresponds to the specific content are all identical as a copyrighted work, and
wherein at least one of the broadcast content and the specified distribution content differs from the specific content with respect to an image quality.

4. The recording apparatus according to claim 2, further comprising:
a judging unit operable to judge whether to record the received broadcast content; and
a content recording unit operable to record the received broadcast content to the storage area when the judging unit judges to record the broadcast content.

5. The recording apparatus according to claim 4, wherein the judging unit judges not to record the received broadcast content when the entry information is attached, and judges to record the received broadcast content when the entry information is not attached.

6. The recording apparatus according to claim 4,
wherein the entry information further includes information showing image quality of the distribution content specified by the entry information, and
wherein the judging unit judges to record the received broadcast content when image quality of the received broadcast content is higher than the image quality shown by the entry information, and judges not to record the received broadcast content when the image quality of the received broadcast content is lower than the image quality shown by the entry information.

7. The recording apparatus according to claim 4, wherein the judging unit judges to record the received broadcast content when a free storage space remaining in the storage area is greater than a storage space required for recording the received broadcast content, and judges not to record the received broadcast content when the free storage space is smaller than the storage space required for recording the received broadcast content.

8. The recording apparatus according to claim 4, wherein the entry information recording unit does not record the entry information when the received broadcast content is judged to be recorded.

9. The recording apparatus according to claim 8, wherein the entry information recording unit records, to the storage area, the entry information attached the received broadcast content being recorded by the content recording unit when a free storage space remaining in the storage area falls short to record entirety of the received broadcast content.

10. The recording apparatus according to claim 2, further comprising:
a content recording unit operable to record the received broadcast content to the storage area; and
a content deleting unit,
wherein the entry information further includes information showing a release date-time on which the distribution content starts to be available for distribution, and
wherein the content deleting unit deletes the broadcast content recorded by the content recording unit from the storage area on or after the release date-time.

11. The recording apparatus according to claim 2, further comprising
a content recording unit operable to record, to the storage area, the distribution content that is distributed by the distributing apparatus in response to the distribution request,
wherein the entry information further includes information showing an expiry date-time after which the distribution content is no longer available for distribution, and
wherein the requesting unit requests distribution of the distribution content prior to the expiry date-time.

12. The recording apparatus according to claim 2, further comprising
an entry information requesting unit operable to request the distributing apparatus to distribute the entry information when any information item is missing in the entry information attached to the received broadcast content,
wherein the entry information recording unit records, to the storage area, the entry information that is distributed from the distributing apparatus in response to the request from the entry information requesting unit.

13. The recording apparatus according to claim 2,
wherein the receiving unit receives, from the broadcasting apparatus, a broadcast content corresponding to a first content and having first entry information attached thereto, the first entry information specifying a distribution content that is (i) composed of video and audio data and (ii) identical to the first content with respect to a substance of the video and audio data of the first content, and further receives, after the entry information recording unit records the first entry information, a broadcast content that corresponds to a second content and that is broadcast with second entry information attached thereto, the broadcast content that corresponds to the second content being broadcast from another broadcasting apparatus during the broadcasting of the broadcast content corresponding to the first content, the second entry information specifying a distribution content that is (i) composed of video and audio data and (ii) identical to the second content with respect to a substance of the video and audio data of the second content, and
wherein the entry information recording unit records the first entry information to the storage area when the receiving unit receives the broadcast content to which the first entry information is attached, and further records the second entry information to the storage area when the receiving unit receives the broadcast content to which the second entry information is attached.

14. The recording apparatus according to claim 2,
wherein the broadcasting apparatus broadcasts a broadcast content multiplexed with another broadcast content, one of the broadcast contents corresponding to a first content and having first entry information attached thereto, the first entry information specifying a distribution content that is (i) composed of video and audio data and (ii) identical to the first content with respect to a substance of the video and audio data of the first content, and the other broadcast content corresponding to a second content and having second entry information attached thereto, the second entry information specifying a distribution content that is (i) composed of video and audio data and (ii) identical to the second content with respect to a substance of the video and audio data of the second content, and
wherein the information recording unit records the first entry information and the second entry information to the storage area.

15. A computer-readable storage medium having a recording program stored thereon, the recording program causing a computer to execute a method comprising:
receiving, from a broadcasting apparatus for broadcasting broadcast contents wherein each broadcast content broadcast from the broadcasting apparatus (i) is for being broadcast together with entry information attached thereto and (ii) corresponds to a specific content composed at least of video and audio data, a broadcast content being (i) composed of video and audio data and (ii) identical to a specific content of the broadcast contents with respect to a substance of the video and audio data of the specific content, the received broadcast content being received together with attached entry information specifying a distribution content of a plurality of distribution contents available for distribution by a distributing apparatus, the specified distribution content being composed of video and audio data and that is identical to the specific content with respect to a substance of the video and audio data of the specified content;
recording, in response to a user operation requesting that the received broadcast content be recorded, the entry information attached to the received broadcast content, the entry information being recorded to a storage area;
requesting the distributing apparatus to distribute the distribution content specified by the recorded entry information; and
playing back the distribution content that is distributed by the distributing apparatus in response to the distribution request.

* * * * *